United States Patent [19]
Onodera

[11] Patent Number: 5,357,645
[45] Date of Patent: Oct. 25, 1994

[54] APPARATUS FOR CLEANING AND DRYING HARD DISK SUBSTRATES

[75] Inventor: Masami Onodera, Niigata, Japan

[73] Assignee: System Seiko Co., Ltd., Niigata, Japan

[21] Appl. No.: 61,107

[22] Filed: May 14, 1993

Related U.S. Application Data

[63] Continuation-in-part of Ser. No. 797,861, Nov. 26, 1991.

[30] Foreign Application Priority Data

Apr. 9, 1989 [JP] Japan .................................. 1-228993

[51] Int. Cl.$^5$ .............................................. B08B 11/02
[52] U.S. Cl. ...................................... 15/97.1; 15/88.2; 134/902; 134/83
[58] Field of Search .................... 15/97.1, 88.2, 88.3, 15/88.4; 134/902, 82, 83

[56] References Cited

U.S. PATENT DOCUMENTS 5,092,011 3/1992 Gommori et al. .................. 15/88.2

*Primary Examiner*—Edward L. Roberts
*Attorney, Agent, or Firm*—Lowe, Price, LeBlanc & Becker

[57] ABSTRACT

An apparatus for cleaning and then drying batches of hard disk substrates includes a substrate cleaning station and a substrate drying station. The substrate cleaning station includes a first index table supporting thereon at least three circumferentially spaced first substrate carriers on which hard disk substrates are mounted respectively. The substrate drying station includes a second index table disposed rearward of the first index table and supporting thereon at least three circumferentially spaced second substrate carriers on which cleaned hard disk substrates are mounted, respectively. Upon rotation of the first index table, each of the first substrate carriers moves successively through a substrate mounting position, a substrate cleaning position and a substrate removing position. Likewise, upon rotation of the second index table, each of the second substrate carriers moves through a substrate mounting position, a substrate drying position and a substrate removing position. Thus, a series of hard disk substrates suppled to the substrate cleaning station are cleaned at the substrate cleaning station, and after that the dried substrates are removed in succession from the substrate drying station.

10 Claims, 15 Drawing Sheets

APPARATUS FOR CLEANING AND DRYING HARD DISK SUBSTRATES

CROSS-REFERENCE TO RELATED APPLICATION

This application is a continuation in part of application Ser. No. 07/797,861, filed on Nov. 26, 1991.

BACKGROUND OF THE INVENTION

1. Field of the Invention

The present invention relates to an apparatus for cleaning and then drying the substrate of a hard disk used in electronic equipments such as computers.

2. Description of the Prior Art

In recent years, with an increasing tendency to use a hard disk drive as an auxiliary storage for electronic equipments such as computers, the demand for quick, low cost production of such drives has increased.

As is well known, the substrate of a hard disk (often referred to simply as "substrate") must be cleaned and then dried after lapping and polishing are completed.

In a previously proposed substrate cleaning and drying machine used heretofore, a single substrate is fed into the machine and after cleaning and drying operations are completed, the substrate is removed from the machine and the next substrate is fed in. Following this, the foregoing cycle of operation is repeated. In other words, the substrates are loaded, cleaned, dried and removed, one at a time.

Accordingly, the prior cleaning and drying apparatus exhibits a relatively long processing time and hence a relatively low processing efficiency.

SUMMARY OF THE INVENTION

It is an object of the present invention to provide an apparatus which can continuously clean and then dry batches of hard disk substrates in a short period of time and at a low cost.

In brief, a cleaning and drying apparatus of this invention is constructed such that a plurality of hard disk substrates (viz., a substrate batch) is fed in succession into a substrate cleaning station. After the cleaning operation is performed, the cleaned substrates are fed one by one into a substrate drying station. When the drying is completed, the substrates are removed one after the other from the apparatus.

An apparatus of this invention for cleaning and then drying hard disk substrates, comprises a first index table intermittently rotatable about a first axis, a second index table intermittently rotatable about a second axis, at least three first substrate carriers, disposed on the first index table and circumferentially spaced at equal angular intervals, for carrying and transferring a plurality of hard disk substrates, and at least three second substrate carriers, disposed on the second index table and circumferentially spaced at equal angular intervals, for carrying and transferring a plurality of hard disk substrates. Upon rotation of the first index table, the first substrate carriers move successively through a first substrate mounting position in which a hard disk substrate is mounted on one of the first substrate carriers, a substrate cleaning position in which a hard disk substrate mounted on one of the first substrate carriers at the first substrate mounting position is cleaned, and a first substrate removing position in which a hard disk substrate cleaned at the substrate cleaning position is removed from one of the first substrate carriers. Upon rotation of the second index table, the second substrate carriers move successively through a second substrate mounting position in which a hard disk substrate removed from the first substrate removing position is mounted on one of the second substrate carriers, a substrate drying position in which a hard disk substrate mounted on one of the second substrate carriers at the second substrate mounting position is dried, and a second substrate removing position in which a hard disk substrate dried at the substrate drying station is removed from one of the second substrate carriers.

According to a preferred embodiment, the number of the first substrate carriers is four, and there are two substrate cleaning positions arranged between the first substrate mounting position and the first substrate removing position. The four first substrate carriers, upon rotation of the first index table, moves successively through the first substrate mounting position, the first substrate cleaning position, the second substrate cleaning position and the first substrate removing position. Likewise, the number of the second substrate carriers is four, and there are two drying positions arranged between the second substrate mounting position and the second substrate removing position. The four second substrate carriers, upon rotation of the second index table, moves successively through the second substrate mounting position, the first substrate drying position, the second substrate drying position and the second substrate removing position.

The apparatus further includes loading means for supplying a plurality of hard disk substrates, one at a time, to the first substrate carrier which is disposed in the first mounting position, transfer means for removing a cleaned hard disk substrate from the first substrate carrier disposed in the first substrate removing position and then transferring the cleaned hard disk substrate to the second substrate carrier which is disposed in the second substrate mounting position, and unloading means for removing a dried hard disk substrate from the second substrate carrier disposed in the second substrate removing position.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE INVENTION

Figure 1:
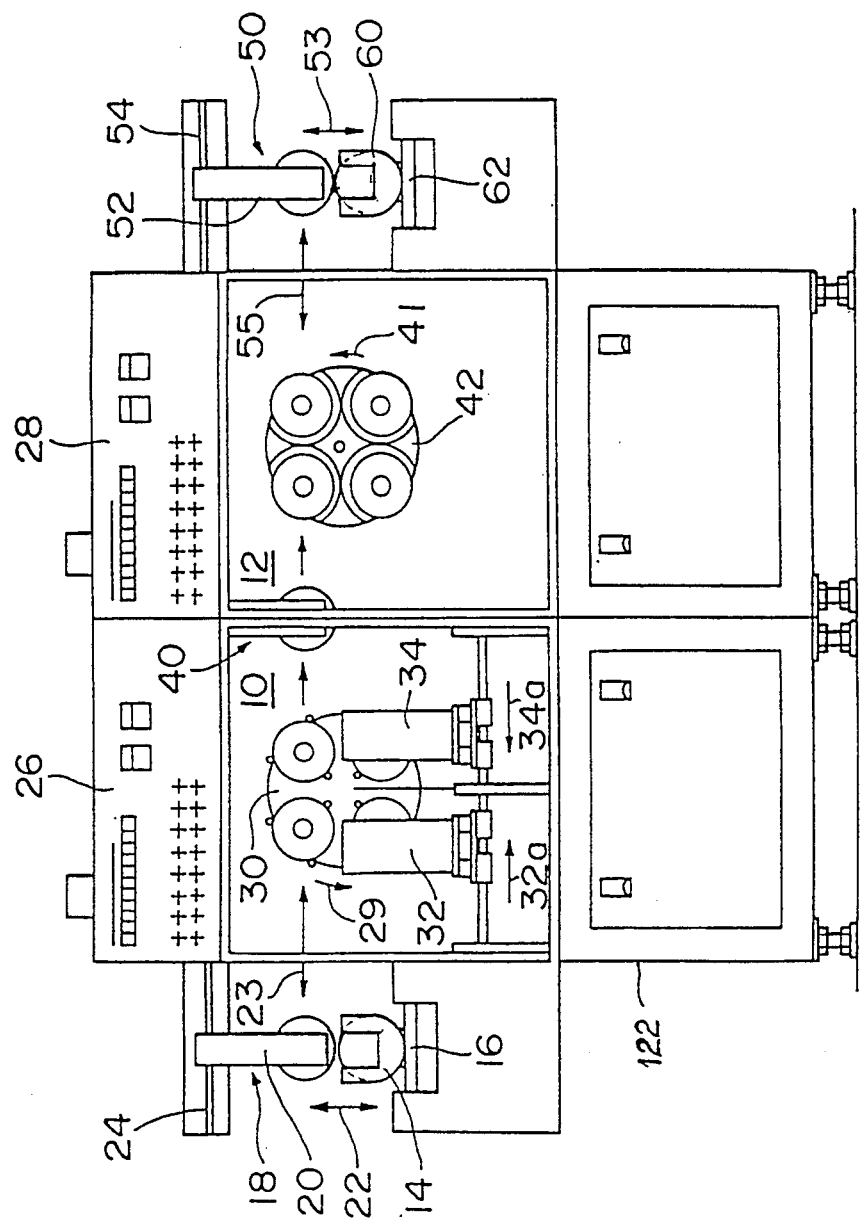
FIG. 1 is a diagrammatical front elevational view of an apparatus for cleaning and then drying hard disk substrates according to the present invention.

FIG. 1 diagrammatically shows the general construction of a hard disk substrate cleaning and drying apparatus according to this invention. The apparatus includes a substrate cleaning station 10 and a substrate drying station 12 which are disposed side by side. Numeral 14 denotes a magazine for receiving a plurality of substrates which require cleaning and drying in the substrate cleaning and drying stations 10 and 12. A plurality of such magazines 14 are arranged in a row and are disposed on a magazine conveying means or conveyor 16 movable in a direction perpendicular to the plane of the drawing sheet. Numeral 18 denotes a substrate loading means or unit for taking the substrates one at a time from the magazine 14 which is located in a substrate supply position shown in FIG. 1 and then loading or supplying the same into the substrate cleaning station 10 of the apparatus. The substrate loading unit 18 includes a grip arm 20 which is vertically movable as indicated by an arrow 22 and which is arranged to pick up one substrate at a time from the substrate magazine 14; and a horizontal rail 24 along which the grip arm 20 is reciprocally movable in the direction indicated by an arrow 23, so as to transfer the substrate to the substrate cleaning station 10. Numerals 26 and 28 denote control panels for controlling the operation of the substrate cleaning station 10 and the substrate drying station 12, respectively.

The substrate cleaning station 10 includes a vertical index table 30 which is intermittently rotatable in the direction indicated by an arrow 29; a plurality (four in the illustrated embodiment) of substrate carriers (described later with reference to FIG. 2); and first and second substrate cleaning units 32, 34. The first and second substrate cleaning units 32, 34 each includes a pair of cleaning pads and two cleaning rollers, as will become apparent later.

Each of the substrate cleaning units 32 and 34 is horizontally movable between a cleaning or working position shown in FIG. 1 and a standby position wherein the units 32 and 34 are spaced laterally from the cleaning position. The substrate cleaning units 32, 34 are normally disposed in the standby position and when the cleaning operation starts, they are moved forward into the working position, as indicated by arrows 32a and 34a. After the cleaning operation in the substrate cleaning station 10 is completed, the cleaned substrates are taken from the substrate cleaning station 10 one at a time and transferred into the substrate drying station 12 by means of a substrate transfer means or unit 40.

The substrate drying station 12 includes a vertical index table 42 intermittently rotatable in the direction of an arrow 41, and a plurality (four in the illustrated embodiment) of substrate carriers, described later with reference to FIG. 2. The substrates which are dried in the substrate drying station 12 are removed one by one from the substrate drying station 12 and then unloaded into a magazine 60 by means of a substrate unloading means or unit 50.

The substrate unloading unit 50 includes a grip arm 52 and a horizontal rail 54 along which the grip arm 52 is reciprocally movable in the direction indicated by the arrow 55. This grip arm 52 picks up one substrate at a time from the substrate drying station 12 and transfers the same into a position directly above the magazine 60 which is disposed in a substrate receiving position shown in FIG. 1. The grip arm 52 is also vertically movable as indicated by an arrow 53 to enable the substrate to be lowered into the magazine. 60. A plurality of such magazines 60 are provided and they are disposed on a magazine conveying means or conveyor 62. The magazine conveyor 62 is movable in a direction perpendicular to the plane of the drawing sheet and is arranged to convey a row of magazines 60 into a subsequent processing station in which the cleaned and dried substrates are disposed in hard disk cassettes.

Figure 2:
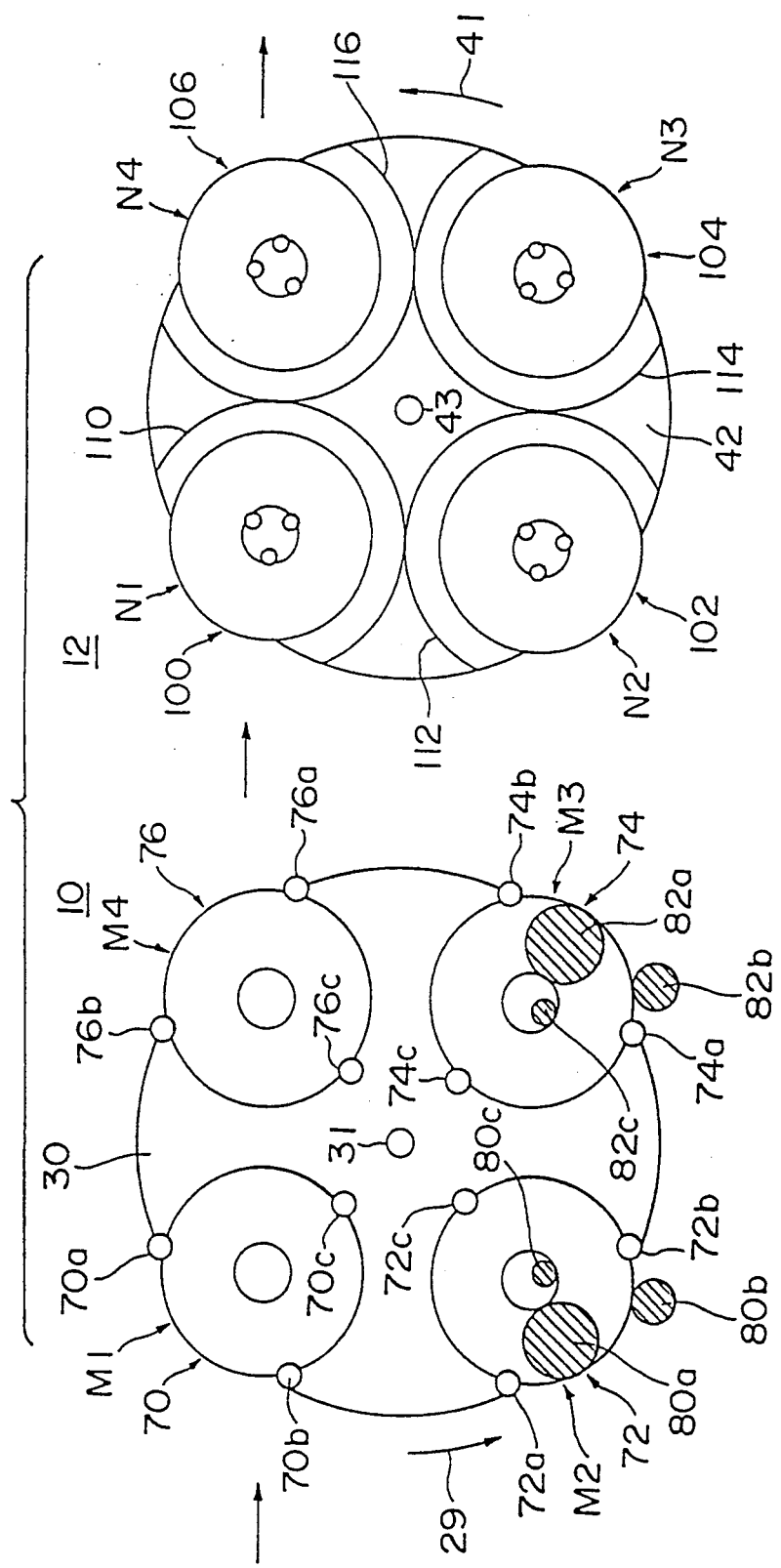
FIG. 2 is an enlarged detail view of a main portion of the apparatus shown in FIG. 1.

As shown in FIG. 2, the substrate cleaning station 10 includes the above-mentioned index table 30 which is intermittently rotatable about a shaft 31 in the direction indicated by the arrow 29, preferably in synchronism with intermittent rotation of the index table 42 of the substrate drying station 12. In the illustrated embodiment, four substrate carriers 70, 72, 74 and 76 are disposed on the index table 30 and circumferentially spaced at equal angular intervals about the shaft 31.

Each of the substrate carriers 70–76 includes three substrate holders 70a, 70b, 70c; 72a, 72b, 72c; 74a, 74b, 74c; and 76a, 76b, 76c which are circumferentially spaced at equal angular intervals and which cooperate with each other to rotatably support an outer peripheral edge of the substrate. In FIG. 2, the substrate carriers 70, 72, 74 and 76 are disposed in a substrate mounting position M1, a first cleaning position M2, a second cleaning position M3, and a substrate removing position M4, respectively.

FIG. 2 also illustrates an internal construction of the first and second cleaning units 32, 34 shown in FIG. 1. The first cleaning unit 32 includes three cleaning members 80a, 80b and 80c. The first cleaning member 80a is composed of a pair of rotating pad-like cleaning elements, such as sponge pads, which are disposed on opposite sides of the substrates and which are frictionally engageable with the opposite sides of the substrate for cleaning the opposite sides of the same. In this figure, only the sponge pad disposed on the front side of the substrate is illustrated. The second and third cleaning members 80b and 80c are cleaning rollers frictionally engageable with inner and outer peripheral edges, respectively, of the substrate for cleaning these edges. Likewise, the second cleaning unit 34 is composed of three cleaning members 82a, 82b and 82c which correspond in construction and operation to the cleaning members 80a, 80b and 80c of the first cleaning unit 32, and hence a further description will be omitted. As the substrate is cleaned on its opposite sides by two confronting pad-like cleaning members 80a, the substrate carriers 70–76 are so constructed as to hold the respective substrates in a spaced-apart relation to the front surface of the index table 30. The space between the substrates and the index table 30 is in the range of 10 to 15 cm, for example.

Operation of the apparatus performed at the substrate cleaning station 10 will be described below with reference to FIG. 2. Let it be assumed that the operation begins with the apparatus in a condition in which none of the substrate carriers 70–76 is supporting a substrate. The first substrate is picked up from the magazine 14 (FIG. 1) and then transferred to the substrate carrier 70 which is located at the substrate mounting position M1. In this instance, the substrate holders 70a, 70b, 70c are moved radially outwardly so that the first substrate can be disposed between the substrate holders 70a, 70b, 70c. Following this, the holders 70a, 70b, 70c are moved inwardly until they engage the outer peripheral edge of the first substrate.

Then, the index table 30 is turned in the direction of the arrow 29 through an angle of 90 degrees. With this angular movement of the index table 30, the substrate carriers 70 and 76 are disposed in the first cleaning position M2 and the substrate mounting portion M1, respectively. Subsequently, a next substrate (viz., the second substrate) is transferred to the substrate carrier 76 which is now located at the substrate mounting portion M1, in the same manner as done with the first substrate described above. Upon arrival of the substrate carrier 70 at the first cleaning position M2, the first cleaning unit 32 is displaced from the standby position to the working position shown in FIG. 1 and the cleaning members 80a, 80b, 80c of the cleaning unit 32 are activated to perform a scrub cleaning operation using a neutral liquid detergent. In this instance, the rotating pad-like cleaning members 80a (only one being shown in FIG. 2) are brought into friction contact with the opposite sides of the substrate held on the substrate carrier 70. Since the substrate is rotatably supported by the substrate holders 70a, 70b, 70c, the substrate rotates about its own axis at the same time as the rotating pad-like cleaning members 80a are rotating about their own axes.

After the second substrate is mounted on the substrate carrier 76 located at the substrate mounting position M1, and after the first substrate which is supported on the substrate carrier 70 is cleaned at the cleaning position M2, the first cleaning unit 32 is displaced to the standby position where it is out of interference with the movement of the index table 30. Subsequently, the index table 30 turns again in the direction of the arrow 29 through an angle of 90 degrees. Accordingly, the index table 30 is conditioned such that three adjacent substrates 70, 76 and 74 are located in the second cleaning position M3, the first cleaning position M2 and the substrate mounting position M1, respectively.

The second cleaning unit 34, having the same construction as the first cleaning unit 32 described above, performs an additional cleaning operation using either tap or purified water. At this time, the first cleaning unit 32 is placed again into the working position and performs a scrub cleaning operation on the second substrate using the neutral liquid detergent, while the substrate carrier 74 which is currently located in the substrate mounting position M1 receives a third substrate.

After the loading of the third substrate and the cleaning of the first and second substrates are completed, the index table 30 is further rotated in the direction of the arrow 29 through an angle of 90 degrees. With this angular movement of the index table 30, the substrate carriers 70, 76, 74 and 72 are disposed in the substrate removing position M4, the second cleaning position M3, the first cleaning position M2 and the substrate mounting position M1, respectively. The first substrate supported on the substrate carrier 70 is rinsed with a shower of purified water at the substrate removing position M4 and then removed from the substrate carrier 70 by means of the substrate transfer unit 40, which in turn delivers the cleaned substrate into the drying station 12.

Thus, a series of substrates are sequentially cleaned at the substrate cleaning station 10 and subsequently delivered into the next following station, i.e., the substrate drying station 12.

The substrate drying station 12 includes the above-mentioned index table 42 which is intermittently rotatable about a shaft 43 in the direction indicated by an arrow 41. In the illustrated embodiment, four substrate carriers 100, 102, 104 and 106 are disposed on the index table 42 and circumferentially spaced at equal angular intervals about the shaft 43. In FIG. 2, the substrate carriers 100, 102, 104 and 106 are disposed in a substrate mounting position N1, a first drying position N2, a second drying position N3, and a substrate removing position N4, respectively. Each of the substrate carriers 100–106 is constructed to rotatably support a substrate at its inner peripheral edge.

Each substrate carrier 100–106 is provided with a spin motor (not shown) for enabling a spin drying operation of the substrate carried on the substrate carrier 100–106. Numerals 110, 112, 114 and 116 denote arcuate splash guards which extend around the respective substrate carriers 100–106 for preventing water on each substrate from splashing onto another substrate while the spin dry operation is being performed.

Operation of the apparatus performed at the substrate drying station 12 will be described below with reference to FIG. 2. For purposes of illustration, operation begins with the apparatus in the condition wherein none of the substrate carriers 100–106 is supporting a substrate.

A substrate (first substrate) which is removed from the substrate removing position M4 of the substrate cleaning station 10 is transferred, by the substrate transferring unit 40, to the substrate carrier 100 located at the substrate mounting position N1 of the substrate drying station 12.

Then, the index table 42 is turned in the direction of the arrow 41 through an angle of 90 degrees. With this angular movement of the index table 41, the substrate carriers 100, 102, 104 and 106 are disposed in the first drying position N2, the second drying position N3, the substrate removing position N4 and the substrate mounting position N1, respectively. Upon arrival of the substrate carrier 100 at the first drying position N2, the substrate carrier 100 is driven by the spin motor (not shown) to spin the first substrate at a high speed, thereby removing superfluous water from the first substrate. The drying operation performed in this manner is referred to as a spin dry operation. During this operation, the next substrate (viz., the second substrate) is supplied to the substrate carrier 106 located at the substrate mounting portion N1, in the same manner as done with the first substrate as described above.

Subsequently, the index table 42 further turns in the direction of the arrow 41 through an angle of 90 degrees. This angular movement of the index table 42 brings the substrate carriers 100, 102, 104 and 106 respectively in the second drying position N3, the substrate removing position N4, the substrate mounting position N1 and the first drying position N2. The first substrate located at the second drying position N3 is subjected to an additional spin dry operation. On the other hand, a third substrate is mounted on the substrate carrier 104 at the substrate mounting position N1, and the second substrate held on the substrate carrier 106 is subjected to a spin dry operation at the first drying position N2. In order to improve the efficiency of the spin dry operation, the first substrate may be continuously spun while the substrate carrier 100 moves from the first drying position N2 to the second drying position N3.

The index table 42 is then turned in the direction of the arrow 41 through an angle of 90 degrees. With this angular movement of the index table 42, the substrate carriers 100, 102, 104 and 106 are disposed in the substrate removing position N4, the substrate mounting position N1, the first drying position N2 and the second drying position N3, respectively. The first substrate supported on the substrate carrier 100, now located at the substrate removing position N4, is removed from the substrate drying station 12 by means of the substrate unloading unit 50 (FIG. 1). During this process, a fourth substrate is supplied to the substrate carrier 102 at the substrate mounting position N1, the third substrate held on the substrate carrier 104 is subjected to a first spin dry operation, and the second substrate held on the substrate carrier 106 is subjected to a second spin dry operation.

Thus, a series of cleaned substrates which are successively supplied from the substrate cleaning station 10, are dried at the substrate drying station 12 and subsequently delivered into a subsequent processing station such as an assembling station in which the cleaned and dried substrates are disposed in hard disk cassettes.

The structure and operation of the individual components of the apparatus (viz., the substrate loading unit 18, the substrate unloading unit 50, the index table 30 including the substrate holders 70-76, the cleaning units 32 and 34, the substrate transfer unit 40, and the index table 34 including the substrate carriers 100-106) will be described in greater detail with reference to FIGS. 3 through 15.

Figure 3:
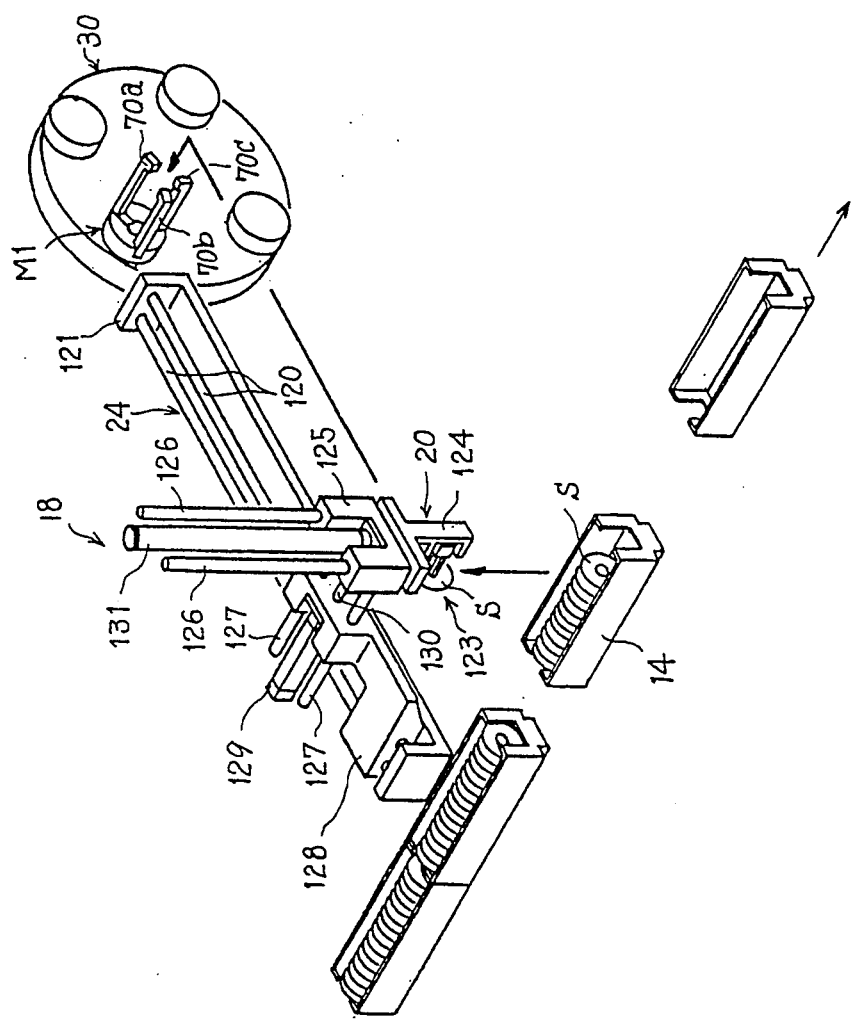
FIG. 3 is a schematic perspective view of a substrate loading unit of the apparatus.

As shown in FIG. 3, the horizontal rail 24 which forms one part of the substrate loading unit 18 is composed of a pair of parallel spaced guide bars 120 supported on an elongated support member 121 secured at one end to a body or frame 122 (FIG. 1) of the apparatus. The grip arm 20 which forms the other part of the substrate loading unit 18 includes a substrate gripper assembly 123 mounted on a body 124 of the grip arm 20. The grip arm body 124 is vertically movably mounted on a support block 125 via a pair of parallel spaced vertical guide bars 126, 126 extending from the grip arm body 124 and slidably supported by the support block 125. The support block 125 has a pair of parallel spaced horizontal guide bars 127 extending in a direction perpendicular to the plane of the index table 30. The guide bars 127 are slidably supported by a saddle 128 which is slidably mounted on the guide bars 120 of the horizontal rail 24.

The saddle 128 has a suitable drive means, such as a drive motor (not shown) built in the saddle 128. The saddle 128 is movable between a first position (receiving position) in which the substrate gripper assembly 123 is disposed above the magazine 14 which is located in the substrate supplying position, and a second position (loading position) in which the substrate gripper assembly 123 is disposed in front of the substrate carrier 70-76 which is located in the substrate mounting position M1. The saddle 128 is normally disposed in the first position.

A first fluid-pressure actuator (air cylinder) 129 is horizontally mounted on the saddle 128 and has a piston rod 130 connected to the support block 125. Thus, the support block 125 is reciprocally movable in a plane perpendicular to the plane of the index table 30 in response to the operation of the first air cylinder 129. The piston rod 130 of the first air cylinder 129 is normally disposed in a fully extended position. Since the support block 125 supports the substrate gripper assembly 123 via the grip arm body 124, the substrate gripper assembly 123 is also movable in the direction perpendicular to the plane of the index table 30.

A second air cylinder 131 is vertically mounted on the support block 125 and has a piston rod (not shown) connected to the grip arm body 124. Thus, in response to the operation of the second air cylinder 131, the grip arm body 124 and the substrate gripper assembly 123 are vertically reciprocable between an upper position and a lower position. The piston rod of the second air cylinder 131 is normally contracted so that the substrate gripper assembly 123 is normally disposed in the upper position.

Figure 4:
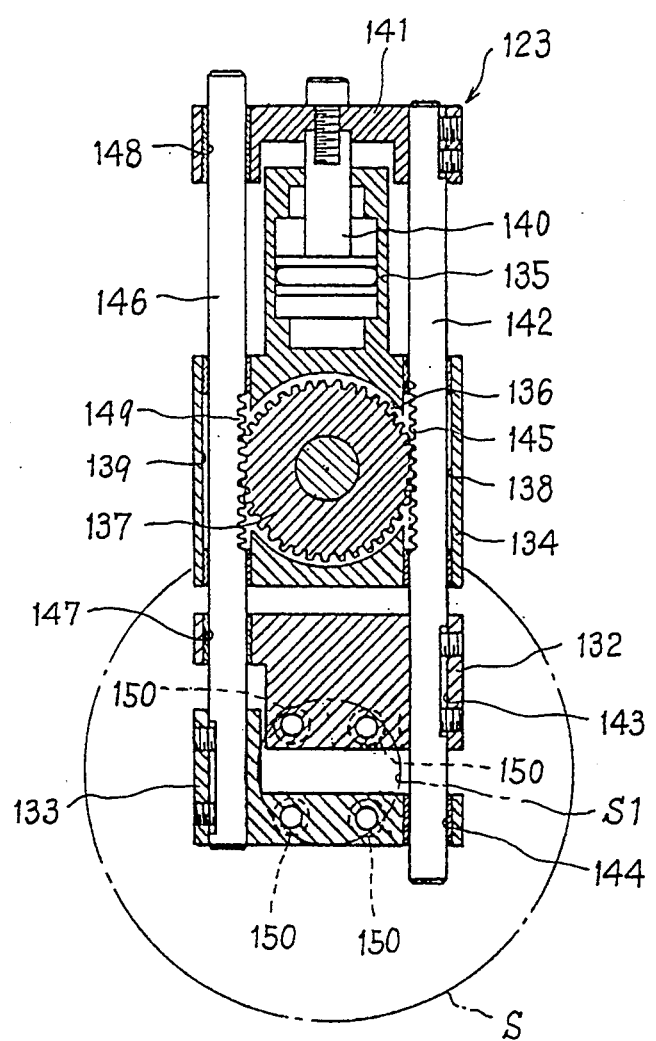
FIG. 4 is a vertical cross-sectional view of a substrate gripper of the substrate loading unit.

The substrate gripper assembly 123 includes, as shown in FIG. 4, a pair of grip fingers 132, 133 movably supported on a gripper body 134 in vertical juxtaposition and driven by a third air cylinder 135 for releasably holding the inner peripheral edge S1 of the substrate S. The gripper body 134 is firmly secured to the grip arm body 124 (FIG. 3) and has a central circular chamber 136 in which a pinion 137 is rotatably mounted. The gripper body 134 further has a pair of vertical guide holes 138, 139 disposed on opposite sides of the central circular chamber 136 and extending contiguously with the central circular chamber 136. The third air cylinder 135 is vertically disposed on an upper end of the gripper body 134 and has a piston rod 140 connected to a connecting plate 141.

The connecting plate 141 is secured by a pair of screws (not designated) to an upper end of a vertical first connecting rod 142. The first connecting rod 142 extends downwardly through the guide hole 138 of the gripper body 134, then through a first guide hole 143 formed in the first (upper) grip finger 132, and finally through a guide hole 144 formed in the second (lower) grip finger 133. The first connecting rod 142 is secured by a pair of screws (not designated) to the first grip finger 132 and has a rack 145 meshing with the pinion 137. Similarly, a vertical second connecting rod 146 has a lower end secured by a pair of screws (not designated) to the second grip finger 133. The second connecting rod 146 extends upwardly through a second guide hole 147 formed in the first grip finger 132, then through the guide hole 139 of the gripper body 134, and finally through a guide hole 148 formed in the connecting plate 141. The second connecting rod 146 has a rack 149 meshing with the pinion 137.

Each of the first and second (upper and lower) grip fingers 132, 133 has two laterally spaced clamp rollers 150 freely rotatably mounted on the corresponding grip finger 132, 133 and engageable with the inner peripheral edge S1 of the substrate S. The clamp rollers 150 are circumferentially grooved so that the inner peripheral edge S1 of the substrate S is received in the grooves of the respective clamp rollers 150.

With the substrate gripper assembly 123 thus constructed, in response to the operation of the third air cylinder 135, the first and second grip fingers 132 and 133 are movable toward and away from each other to releasably hold the inner peripheral edge S1 of the substrate S. The piston rod 140 of the third air cylinder 135 is normally disposed in a fully contracted position where a circle defined jointly by the outer peripheral edges of the clamp rollers 150 has a smaller diameter than a circle defined by the inner peripheral edge S1 of the substrate S. When the third air cylinder 135 is driven to extend its piston rod 140, the first connecting rod 142 moves upwards in FIG. 4. Since the first grip finger 132 is firmly connected to the first connecting rod 142, this grip finger 132 moves upwards together with the first connecting rod 142. As the first connecting rod 142 moves upwards, the rack 145 turns the pinion 137 in the counterclockwise direction in FIG. 4, thereby causing the rack 149 to move downwardly. With this downward movement of the rack 149, the second connecting rod 146 moves downwardly. Due to the firm connection with the second connecting rod 146, the grip finger 133 moves downwards together with the second connecting rod 146. Thus, when the piston rod 140 of the third air cylinder 135 is extended, the first and second grip fingers 132 and 133 move away from each other to grip the inner peripheral edge S1 of the substrate S by the clamp rollers 150.

When the substrate S is to be released, the piston rod 140 is contracted to lower the first clamp finger 132 via the first connecting rod 142. Due to a rack and pinion mechanism composed of the racks 145, 149 and the pinion 137, the downward movement of the first connecting rod 142 is translated into an upward movement of the second connecting rod 146 and the second grip finger 133. Thus, in response to the contracting movement of the piston rod 140, the first and second fingers 132, 133 move toward each other, so that the inner peripheral edge S1 of the substrate S is released from the clamp rollers 150.

The substrate loading unit 18 of the foregoing construction is operated in timed relation to the operation of the magazine conveyor 16 (FIG. 1) and the index table 30, in such a manner that the loading unit 18 takes up one substrate S at a time from the magazine 14 which is located in the substrate supply position shown in FIGS. 1 and 3, and subsequently loads or supplies the substrate to the substrate carrier 70-76 which is located in the substrate mounting position M1 shown in FIG. 3.

The substrate loading unit 18 is normally disposed in the position shown in FIG. 3. While the magazine 14 is at rest in the substrate supply position, the second air cylinder 131 is driven to extend its piston rod (not shown) to lower the substrate gripper assembly 123. When the piston rod is fully extended, the first and second grip fingers 132, 133 (FIG. 4) of the gripper assembly 123 are disposed in registry with the central holes of the substrates S received within the magazine 14. Then, the first air cylinder 129 is driven to contract its piston rod 130 to such an extent that the clamp rollers 150 of the first and second grip fingers 132, 133 are received within the central hole of the leading substrate S. Subsequently, the third air cylinder 135 shown in FIG. 4 is driven to extend its piston rod 140 whereupon the first and second grip fingers 132, 133 spread or move away from each other. Thus, the inner peripheral edge S1 of the leading substrate S is caught by the clamp rollers 150. Thereafter, the second air cylinder 131 is driven again to contract its piston rod. Thus, the grip arm 20 moves upwards, with the leading substrate S supported by the substrate gripper assembly 123, as shown in FIG. 3.

Then, the saddle 128 slides along the horizontal guide bars 120 so as to transfer the substrate gripper assembly 123 from the receiving position shown in FIG. 3 to the loading position in which the substrate S held on the substrate gripper assembly 123 is disposed in front of the substrate carrier 70-76 located at in the substrate mounting position M1. In this instance, the substrate holders 70a, 70b, 70c of this particular substrate carrier 70-76 are spread radially outwardly in a manner described later. Upon arrival of the substrate gripper assembly 123 at the loading position, the first air cylinder 129 is driven again to further contract its piston rod 130. When the piston rod 130 is fully contracted, the substrate S held on the substrate gripper assembly 123 is received within a space defined by the substrate holders 70a-70c. Then, the substrate holders 70a-70c are contracted to grip the outer peripheral edge of the substrate S in a manner described later, and after that the third air cylinder 135 (FIG. 4) is driven again to contract its piston rod 140. The first and second grip fingers 132, 133 advance toward each other whereby the substrate S is released from the clamp rollers 150 of the substrate gripper assembly 123. Then, the first air cylinder 129 is driven again to extend its piston rod 130, and subsequently the saddle 128 returns from the loading position to the receiving position shown in FIG. 3. The foregoing cycle of operation is repeated so that the substrates S are successively supplied from the magazine 14 to the substrate carrier 70-76 of the index table 30 which is disposed in the substrate mounting position M1.

Figure 5:
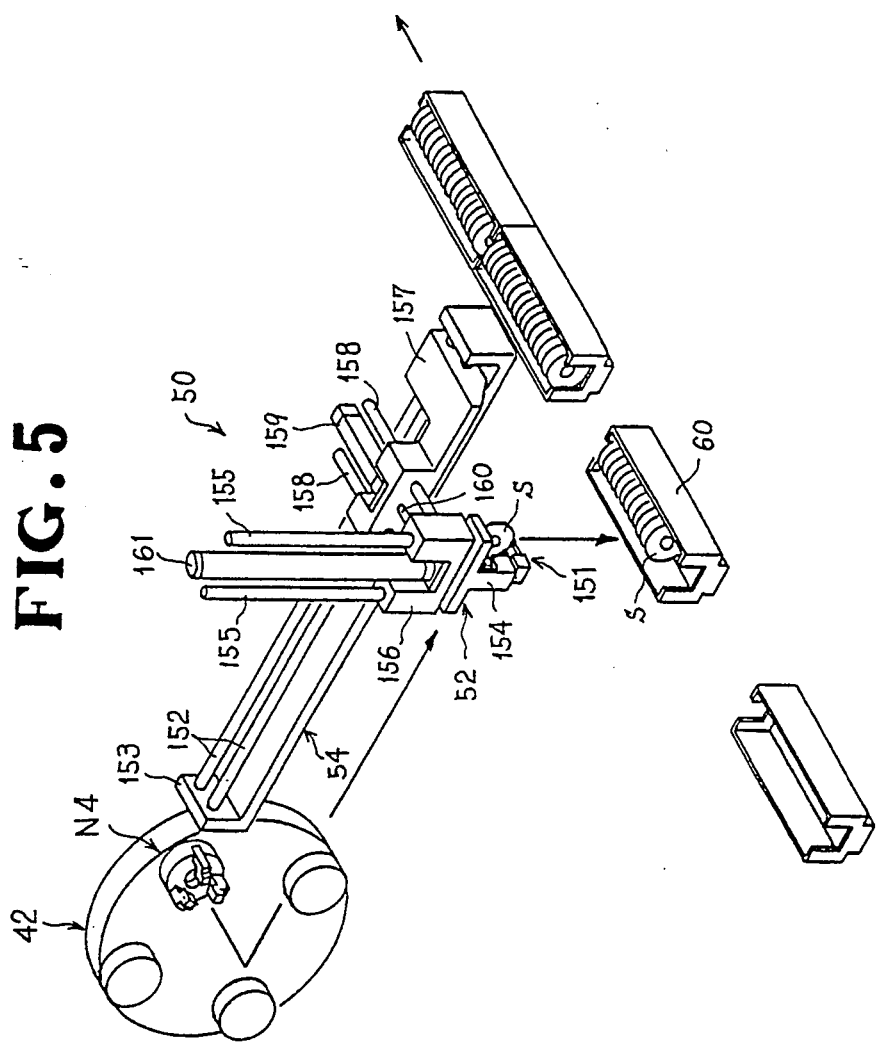
FIG. 5 is a schematic perspective view of a substrate unloading unit of the apparatus.

The substrate unloading unit 50 shown in FIG. 5 differs from the above-mentioned substrate loading unit 18 in that a substrate gripper assembly 151 of the unloading unit 50 is constructed so as to grip the outer peripheral edge S2 (FIG. 6) of the substrate S. Other parts are substantially the same as those of the loading unit 18 and, hence, a detailed description thereof can be omitted.

The horizontal rail 54 which forms one part of the unloading unit 50 is composed of a pair of parallel spaced guide bars 152 supported on an elongated support member 153 secured at one end to the frame 122 (FIG. 1) of the apparatus. The grip arm 52 which forms the other part of the unloading apparatus 50 has a body 154 on which the gripper assembly 151 is mounted. The grip arm body 154 includes a pair of parallel spaced vertical guide bars 155 slidably supported by a support block 156 which is horizontally movably supported on a saddle 157 via a pair of parallel spaced horizontal guide bars 158 extending from the support block 156. The saddle 157 is slidably mounted on the guide bars 152 and movable between a first position (unloading position) and a second position (receiving position) by means of a suitable drive means, such as a drive motor (not shown) built in the saddle 157. When the saddle 157 is disposed in the first position, the gripper assembly 151 is disposed above the magazine 60 which is located in the substrate receiving position shown in FIGS. 1 and 5. When the saddle 157 is disposed in the second position, the gripper assembly 151 is disposed in front of the substrate carrier 100-106 which is located in the substrate removing position N4. The saddle 157 is normally disposed in the first position.

A fourth air cylinder 159 is horizontally mounted on the saddle 157 and connected to the support block 156 via a piston rod 160. Thus, in response to the operation of the fourth air cylinder 159, the gripper assembly 151 is reciprocally movable in a plane perpendicular to the plane of the index table 42. The piston rod 160 is normally disposed in a fully extended position.

A fifth air cylinder 161 is vertically mounted on the support block 156 and has a piston rod (not shown) connected to the grip arm body 154. Thus, the gripper assembly 151 is vertically movable between an upper position and a lower position in response to the operation of the fifth air cylinder 161. The non-illustrated piston rod of the fifth air cylinder 161 is normally disposed in its contracted position so as to keep the gripper assembly 151 in the upper position.

Figure 6:
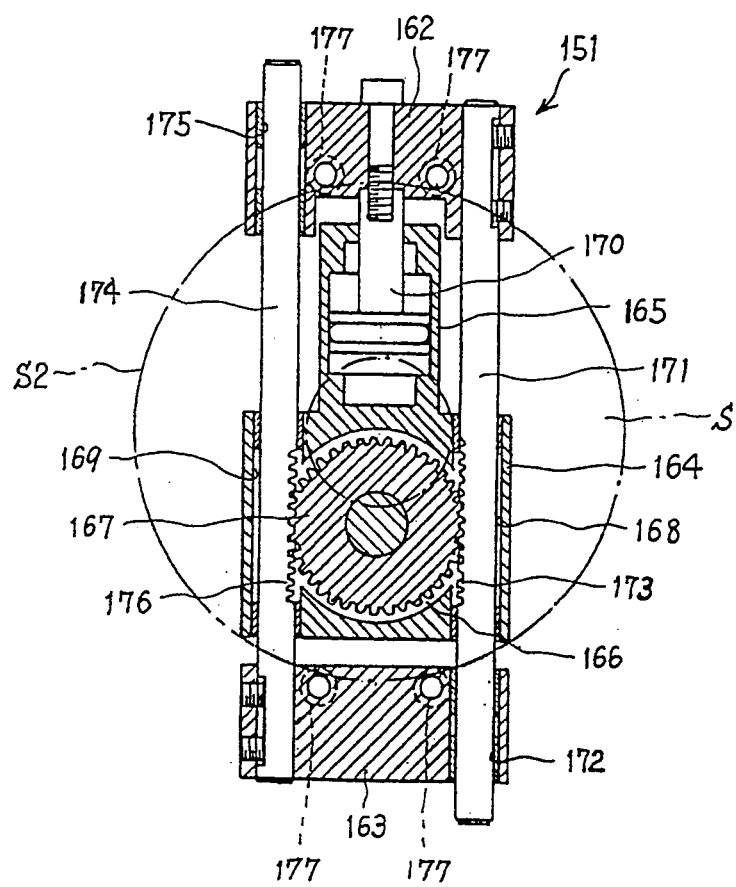
FIG. 6 is a vertical cross-sectional view of a substrate gripper of the substrate unloading unit.

As shown in FIG. 6, the gripper assembly 151 includes a pair of vertically spaced grip fingers 162, 163 movably mounted on a gripper body 164, and a sixth air cylinder 165 vertically disposed on the gripper body 164 for actuating the grip fingers 162, 163 in order to releasably holding the substrate S. The gripper body 164 is secured to the grip arm body 154 (FIG. 5) and has a central circular chamber 166 in which a pinion 167 is rotatably mounted. The gripper body 164 further has a pair of vertical guide holes 168, 169 connected with two diametrically opposed portions of the circular chamber 166. The sixth air cylinder 165 has a piston rod 170 connected by a screw (not designated) to the first (upper) grip finger 162.

A first connecting rod 171 is slidably received in the guide hole 168 and has one end (upper end) secured by a pair of screws (not designated) to the first (upper) grip finger 162. The opposite end portion (lower end portion) of the first connecting rod 171 is slidably guided in a vertical guide hole 172 formed in the second (lower) grip finger 163. The first connecting rod 171 includes a rack 173 meshing with the pinion 167.

A second connecting rod 174 is slidably guided in the guide hole 169 and has one end (lower end) secured by a pair of screws (not designated) to the second grip finger 163. The opposite end portion (upper end portion) of the second connecting rod 174 is slidably guided in a vertical guide hole 175 formed in the first grip finger 162. The second connecting rod 174 has a rack 176 meshing with the pinion 167.

Each of the first and second (upper and lower) grip fingers 162, 163 has a pair of laterally spaced clamp rollers 177. The clamp rollers 177 are circumferentially grooved so that the outer peripheral edge S2 of the substrate S is received in the grooves of the respective clamp rollers 177.

With the gripper assembly 151 thus constructed, when the sixth air cylinder 165 is driven to reciprocate its piston rod 170, the first and second grip fingers 162, 163 are moved toward and away from each other via a rack and pinion mechanism composed of the racks 173, 176 and the pinion 167, thereby enabling the clamp rollers 177 to grip and release the substrate S. The piston rod 170 is normally disposed in a fully extended position in which the clamp rollers 177 on the first grip finger 162 and the clamp rollers 177 on the second grip finger 163 are spaced by a distance greater than the outside diameter of the substrate S. When the sixth air cylinder 165 is activated to contract the piston rod 170, the first grip finger 162 moves downwards in FIG. 6.

The downward movement of the first grip finger 162 is translated into an upward movement of the second grip finger 163 by means of the rack and pinion mechanism 173, 167, 176. The first and second grip fingers 162, 163 move toward each other to grip the outer peripheral edge S2 of the substrate S by the clamp rollers 177.

The substrate unloading unit 50 of the foregoing construction operates in timed relation to the operation of the magazine conveyor 62 (FIG. 1) and the index table 42, in such a manner that the unloading unit 50 takes up the substrate S from the substrate carrier 100–106 which is located in the substrate removing position N4, and subsequently unloads the same substrate S to the magazine 60 which is located in the substrate receiving position shown in FIG. 5.

When the index table 42 is turned to move one substrate carrier 100–106 to the substrate removing position N4, the saddle 157 slides along the horizontal guide bars 152 in one direction so as to transfer the gripper assembly 151 from the unloading position shown in FIGS. 1 and 5 to the receiving position in which the gripper assembly 151 is disposed in front of the substrate carrier 100–106 located in the substrate removing position N4. Then, the fourth air cylinder 159 is driven to contract its piston rod 160 to advance the gripper assembly 151 toward the substrate carrier 100–106. When the piston rod 160 is fully contracted, the substrate S held on the substrate carrier 100–106 at the substrate removing position N4 is received between the clamp rollers 177 (FIG. 6) of the first and second grip fingers 162, 163. Then, the sixth air cylinder 165 is activated to contract its piston rod 170, thereby moving the first and second grip fingers 162, 163 toward each other. Thus, the clamp rollers 177 grip the outer peripheral edge S2 of the substrate S, as shown in FIG. 6. Subsequently, the substrate carrier 100–106 located at the substrate removing position N4 is operated to release the substrate S in a manner described later on, and after that the fourth air cylinder 159 is driven again to extend its piston rod 160. Thus, the gripper assembly 151 while holding the substrate S is retracted from the substrate carrier 100 106 which is located in the substrate removing position N4.

Then, the saddle 157 slides along the horizontal guide bars 152 in the opposite direction so as to return the gripper assembly 151 from the receiving position to the unloading position shown in FIG. 5. Subsequently, the fifth air cylinder 161 is activated to lower the gripper assembly 151 with the result that the substrate S held on the gripper assembly 151 is received within the magazine 60 which is disposed in the substrate receiving position shown in FIGS. 1 and 5. Subsequently, the sixth air cylinder 165 is activated again to extend its piston rod 170 to thereby move the first and second fingers 162, 163 outwardly away from each other. Thus, the clamp rollers 177 on the grip fingers 162, 163 release the substrate S. Thereafter, the fourth air cylinder 159 is activated again to further extend its piston rod 160. Thus, the clamp rollers 176 are retracted away from the surface of the substrate S. Then, the fifth air cylinder 161 is activated again to return the gripper assembly 151 from the lower position to the initial upper position. The foregoing cycle of operation is repeated so that the substrates S are successively unloaded to the magazine 60 from the substrate carrier 100–106 of the index table 42 which is located in the substrate removing position N4.

Figure 7:
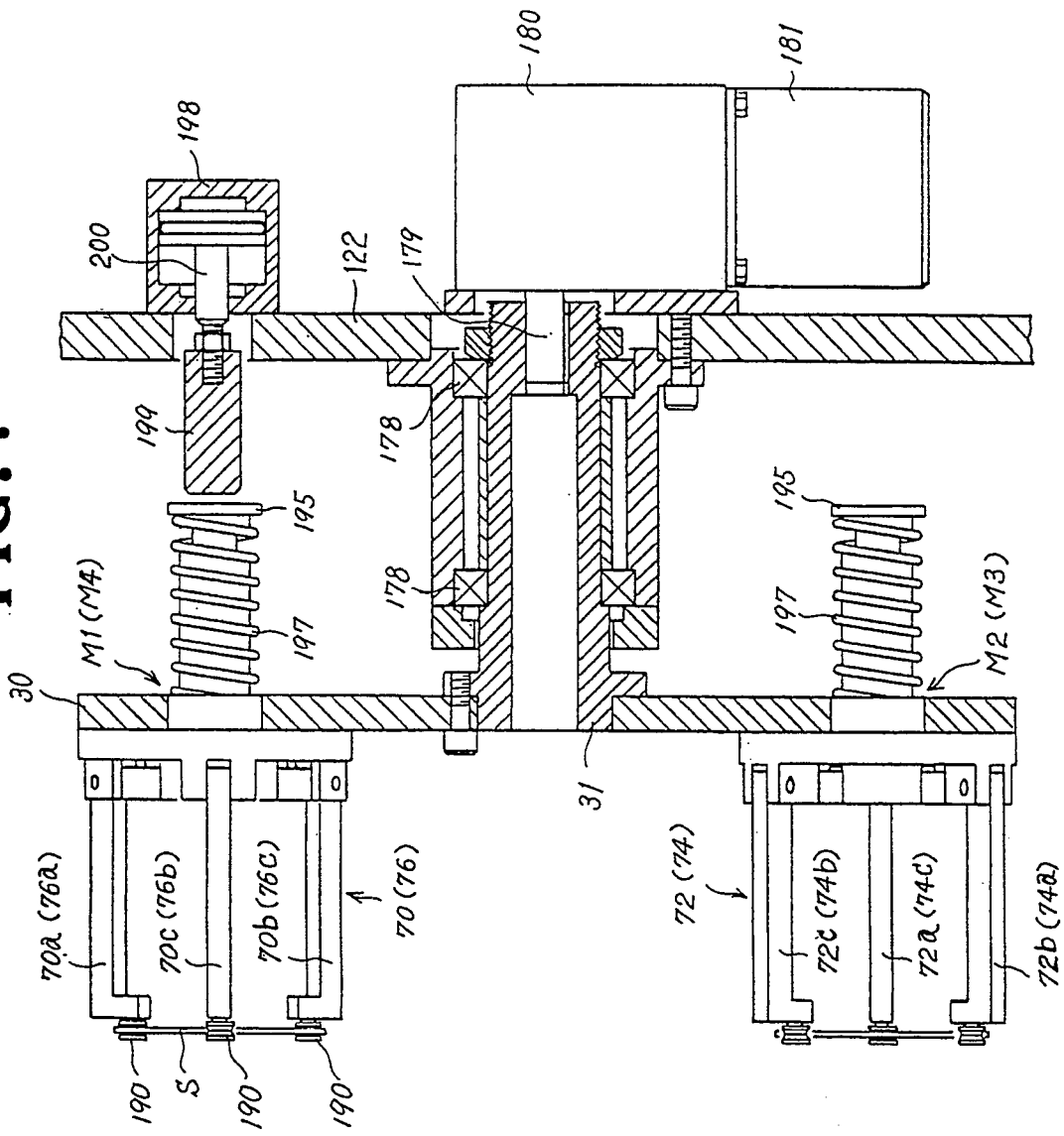
FIG. 7 is a cross-sectional view of an index table incorporated in a substrate cleaning station of the apparatus.

FIG. 7 is a vertical cross-sectional view of the index table 30 having four substrate carriers 70–76 mounted thereon. The shaft 31 of the index table 30 is a hollow shaft which is rotatably mounted on the frame 122 of the apparatus via a pair of ball bearings 178. One end of the shaft 31 is screwed to a body of the index table 30, while the opposite end of the shaft 31 is keyed to a drive shaft 179 of a index head 180 secured to the frame 122. The index head 180 is equipped with a drive motor 181. As mentioned previously, the substrate carriers 70–76 are circumferentially spaced at equal angular intervals and each include three substrate holders 70a–70c, 72a–72c, 74a–74c, 76a–76c. The substrate carriers 70–76 have the same construction and, hence, only one substrate carrier 70 will be described below in greater detail with reference to FIG. 8.

Figure 8:
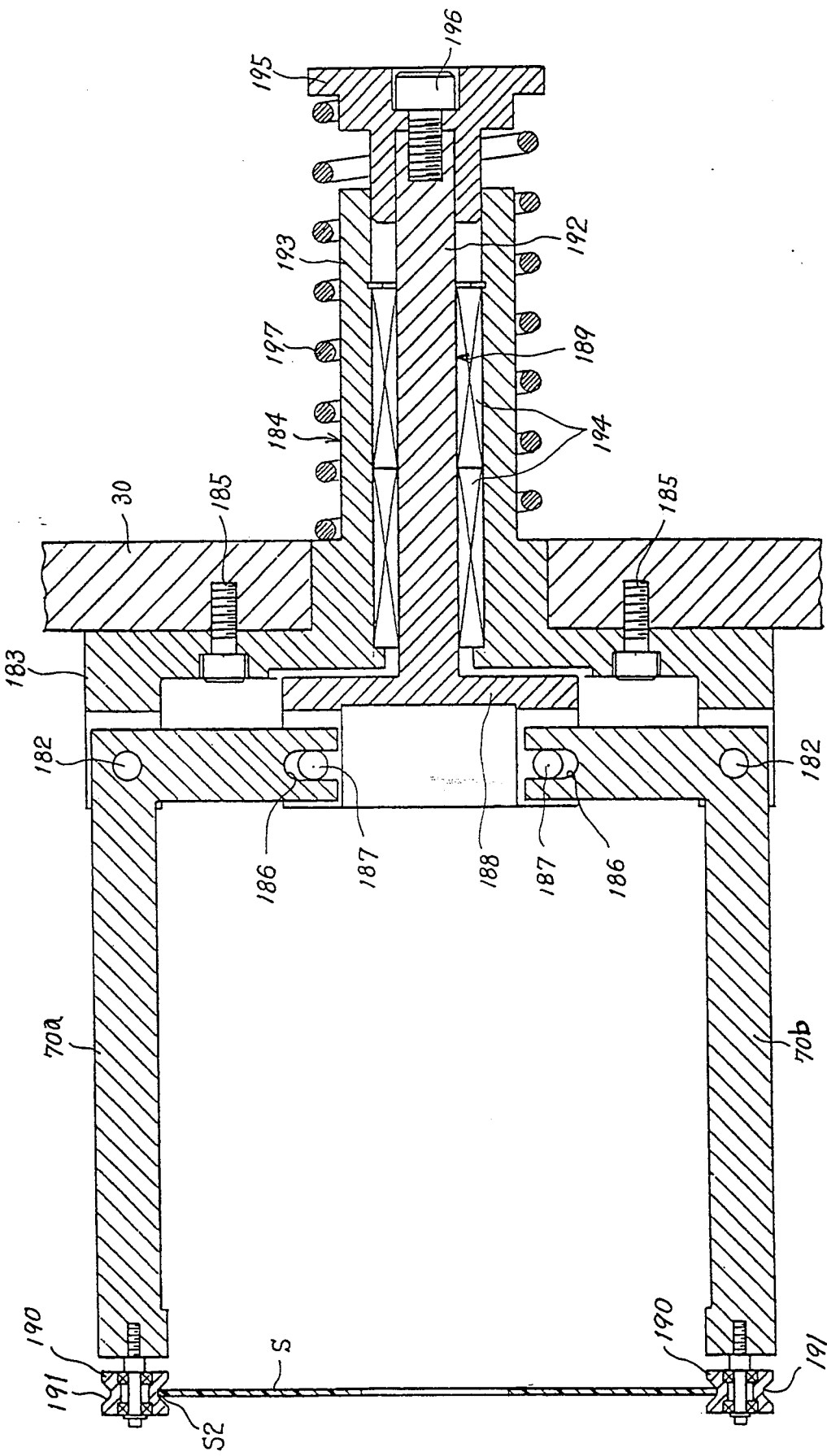
FIG. 8 is an enlarged cross-sectional view of a portion of the index table including a substrate holder.

As shown in FIG. 8, each of the substrate holders (two being shown) 70a, 70b is composed of an L-shaped lever pivotally connected by a pin 182 to a circular disk-like head 183 of a support member 184 which is secured by a plurality of screws 185 to the index table 30. One end of the L-shaped lever (substrate holder) 70a–70c has a slot or groove 186 slidably receiving therein a pin 187 which is provided on a head portion 188 of a slide member 189. The opposite end of the L-shaped lever 70a–70c is provided with a clamp roller 190. The clamp roller 190 is freely rotatable and circumferentially grooved as at 191 for receiving therein a portion of the outer peripheral edge S2 of the substrate S when the substrate S is gripped by the substrate carrier 70. The slide member 189 includes a shaft 192 slidably received in a tubular portion 193 of the support member 184 via a pair of ball bearings 194. The shaft 192 is integral with the head portion 188 and is connected at its distal end with a disk-like abutment member 195 by means of a screw 196. A compression coil spring 197 is loosely fitted around the tubular portion 193 and acts between the support member 184 and the abutment member 195. The compression coil spring 197 thus provided urges the slide member 189 in the right-hand direction in FIG. 8, thereby turning the L-shaped levers 70a–70c in one direction about the respective pivot pins 182 so that the clamp rollers 190 on the respective levers 70a–70c move toward each other. On the other hand, when the slide member 189 moves in the left-hand direction in FIG. 8 against the force of the compression coil spring 197, the L-shaped levers 70a–70c turn in the opposite direction about the pivot pins 182, thereby moving the respective clamp rollers 190 away from each other. The length and force of the compression coil spring 197 are determined such that when the compression coil spring 197 is in its free state, the clamp rollers 190 are able to clamp the outer peripheral edge S2 of the substrate S without deforming the substrate S.

Referring back to FIG. 7, there is shown a seventh air cylinder 198 which is attached to the frame 122 at a portion confronting to the substrate mounting position M1 of the cleaning station 10 (FIG. 2). The seventh air cylinder 198 includes a push rod 199 connected to a piston rod 200 of the seventh air cylinder 198. The piston rod 200 is normally disposed in the contracted position shown in FIG. 7 where the push rod 199 is aligned with, and axially spaced from, the abutment member 195 of the substrate carrier 70–76 which is disposed in the substrate mounting position M1. When the seventh air cylinder 198 is activated to extend its piston rod 200, the push rod 199 engages the abutment member 195 and then forces the same in the left-hand direction in FIG. 7 against the force of the compression coil spring 197. With this leftward movement of the abutment member 195, the slide member 189 (FIG. 8) slides leftwards in FIG. 8, thereby turning the L-shaped levers (substrate holders) 70a–70c in such a direction that the clamp rollers 190 move away from each other. Though not shown, an eighth air cylinder which is identical in construction to the seventh air cylinder 198 is mounted on the frame 122 at a position corresponding to the substrate removing position M4 of the cleaning station 10. The eighth air cylinder thus provided is driven to release the substrate S from the substrate carrier 70–76 which is disposed in the substrate removing position M4.

The index table 30 of the foregoing construction operates as follows.

Let it be assumed that operation begins in a condition in which none of the substrate carriers 70–76 is supporting the substrate. The seventh air cylinder 198 shown in FIG. 7 is driven to extend its piston rod 200 whereupon the push rod 199 abuts on the abutment member 195 and then forces the abutment member 195 and the shaft 192 (FIG. 8) of the slide member 189 leftwards against the force of the compression coil spring 197. With this leftward movement of the slide member 189, the L-shaped levers (70a–70c in the illustrated embodiment) are turned in one direction about the pivot pins 182 such that the clamp rollers 190 move away from each other in a radially outward direction of the shaft 192.

Then, the above-mentioned loading unit 18 sets one substrate S in a space defined between the clamp rollers 190, and after that the seventh air cylinder 198 is driven again to contract its piston rod 200. The pusher rod 199 is retracted away from the abutment member 195 whereupon the slide member 189 moves rightwards in FIG. 8 under the force of the compression coil spring 197. With this rightward movement of the slide member 189 the L-shaped levers 70a–70c are contracted to move the clamp rollers 190 toward each other, so that the outer peripheral edge S2 of the substrate S is gripped by the clamp rollers 190, as shown in FIG. 8. Thereafter, the loading unit 18 returns to its initial receiving position which is located remote from the index table 30.

Then, the motor-driven index head 180 (FIG. 7) is driven to turn the index table 30 in the direction of the arrow 29 (FIG. 2) through an angle of 90 degrees. Now, the substrate carrier 70 is disposed in the first cleaning position M2, and the substrate carrier 76 is disposed in the substrate mounting position M1. The foregoing cycle of operation is repeated so that the substrates S are successively supported by the substrate carrier 70–76 which is disposed in the substrate mounting position M1. When the substrate carrier 70 arrives at the substrate removing position M4, the substrate transfer unit 40, described later, is driven to hold the outer peripheral edge S1 of the substrate for taking up the substrate S from the substrate carrier 70. Then, the non-illustrated eight air cylinder is activated to spread the L-shaped levers 70a–70c to release the substrate S from the clamp rollers 190. The eighth air cylinder is driven after each operation of the motor-driven index head 180.

Upon intermittent rotation of the index table 30, the substrate S which is loaded on the substrate carrier 70–76 at the substrate mounting position M1 is brought into the first cleaning position M2 (FIG. 2) and then into the second cleaning position M3 (FIG. 2). In the first cleaning position M2, the scrub cleaning operation using a neutral liquid detergent is performed by the first cleaning unit 32. On the other hand, in the second cleaning position M3, an additional cleaning operation using either tap or purified water is performed by the second cleaning unit 34. Since the first and second cleaning units 32 and 34 have the same construction, only one cleaning unit (the first cleaning unit 32 in the illustrated embodiment) will be described below in greater detail with reference to FIGS. 9 and 10.

Figure 9:
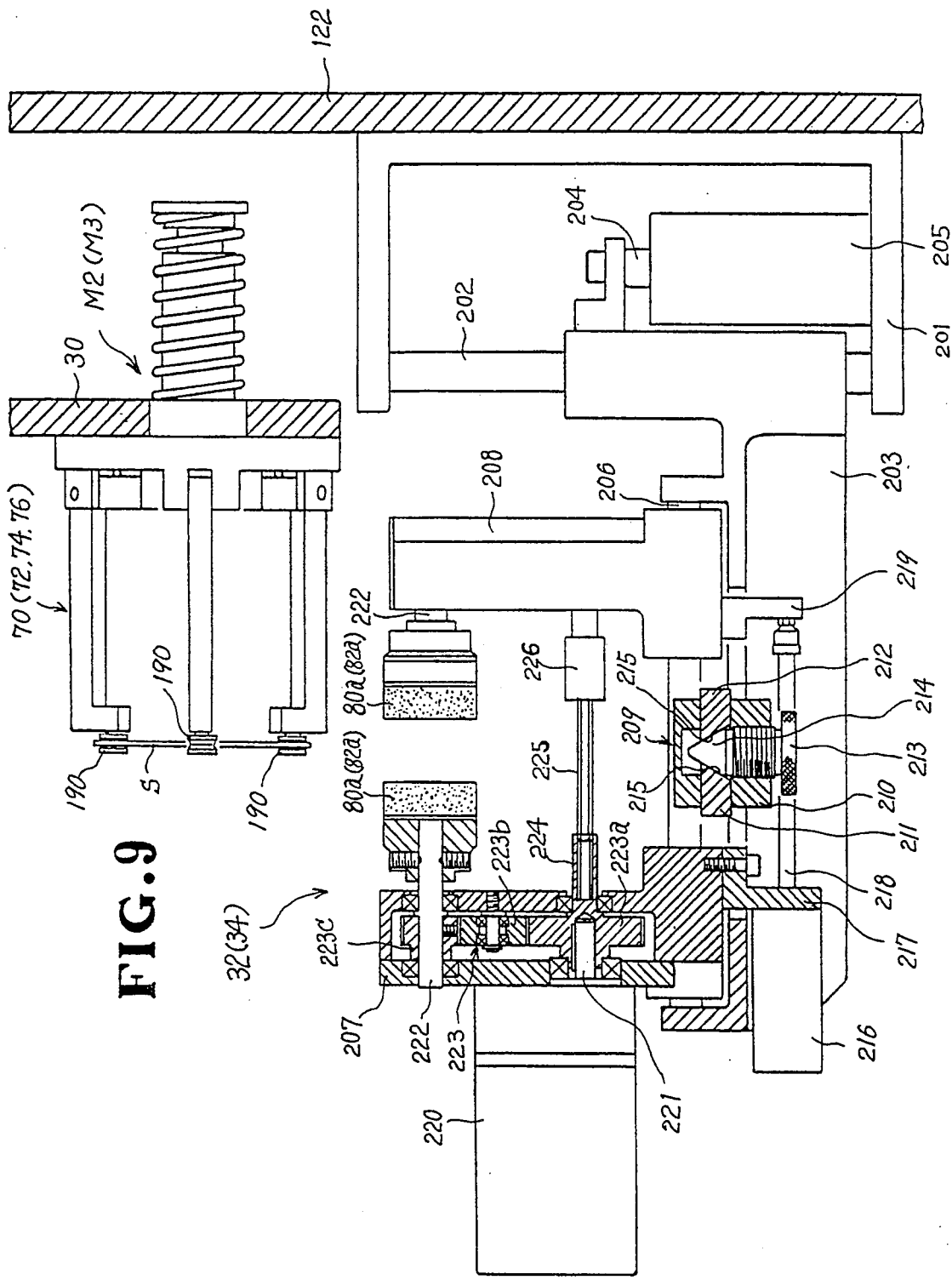
FIG. 9 is a side elevational, partly cross-sectional view, of one part of a cleaning unit of the substrate cleaning station.

As shown in FIG. 9, the cleaning unit 32 includes a bracket 201 attached to the frame 122 and supporting a vertical guide bar 202 on which a support block 203 is slidably and non-rotatably mounted. The support block 203 is connected to a piston rod 204 of a ninth air cylinder 205 which is vertically mounted on the bracket 201. The piston rod 204 is normally disposed in the contracted position. In response to operation of the ninth air cylinder 205, the support block 203 is vertically slidable along the guide bar 202 to move the cleaning unit 32 between the working position shown in FIG. 2 in which the cleaning members 80a-80c are engageable with the substrates S supported on the substrate carrier 70-76 at the first cleaning position M2, and the standby position shown in FIG. 9 in which the cleaning unit 32 is vertically displaced from the first cleaning position M2 and held out of interfere with the index table 30 and the substrate carriers 70-76 mounted thereon. The cleaning unit 32 is normally disposed in the standby position.

The support block 203 includes a pair of horizontal guide bars 206 (only one shown) on which two confronting slide heads 207 and 208 are slidably mounted, with a stopper 209 disposed therebetween. The stopper 209 includes a housing 210 attached to the support block 203, a pair of horizontally aligned stop arms 211, 212 slidably mounted on the housing 210 and engageable with the slide heads 207, 208, respectively, and a vertical adjustment screw 213 threaded into the housing 210 and having a tapered front end 214 held in sliding contact with oblique end portions 215 of the respective stop arms 211, 212. The stop arms 211, 212 are normally urged toward each other by a suitable biasing means such as a spring (not shown). With the stopper 209 thus constructed, by turning the adjustment screw 213, the stop arms 211, 212 simultaneously project from, or retract into, the housing 210 to change the distance between two confronting cleaning members 80a, 80a supported respectively on the slide heads 207, 208.

A tenth air cylinder 216 is horizontally mounted on a bracket 217 attached to the underside of the first slide head 207. The tenth air cylinder 216 has a piston rod 218 connected to a bracket 219 secured to the underside of the second slide head 208. The piston rod 218 is normally disposed in an extended position shown in FIG. 9. When the tenth air cylinder 216 is activated to contract the piston rod 218, the piston rod 218 pulls the second slide head 208 leftwards in FIG. 9 until the second slide head 208 abuts against the stop arm 212. Upon abutting engagement with the stop arm 212, a further leftward movement of the second slide head 208 is prevented. Accordingly, a further contracting action of the piston rod 218 causes a body of the tenth air cylinder 216 to move relative to the piston rod 216 in the rightward direction in FIG. 9. With this rightward movement of the tenth air cylinder body, the first slide head 207 moves rightward toward second slide head 208 until it abuts on the stop arm 211. When the first slide head 207 abuts on the stop arm 211 (viz., when the first and second slide heads 207 and 208 abut on the stopper 209), the confronting pad-like cleaning members 80a, 80a are spaced by a distance which is required to perform a scrub cleaning operation on the opposite surfaces of the substrate S.

The cleaning unit 32 is equipped with drive unit composed of a gearmotor 220 attached to the first slide head 207. The gearmotor 220 has a drive shaft 221 operatively connected with a driven shaft 222 via a set of transmission gears 223 for rotating the pad-like cleaning member 80a which is fixedly mounted on the driven shaft 222. The driven shaft 222 is rotatably mounted on the first slide head 207. The transmission gears 223 is composed of a drive gear 223a keyed to the drive shaft 221 of the gearmotor 220, an intermediate gear 223B interconnecting the drive gear 223a and a drive gear 223c which is screwed to the driven shaft 222. The drive gear 223a has a first spline sleeve 224 integrally formed therewith. The first spline sleeve 224 is slidably fitted over a spline shaft 225 which is slidably fitted in a second spline sleeve 207. The second spline sleeve 227 is rotatably mounted on the second slide head 208 and is connected with a driven shaft 222 of the second slide head 208 via a set of transmission gears (not shown but identical to those of the first slide head 207). The first and second spline sleeves 224, 225 and the spline shaft 225 jointly form a spline coupling which serves to transmit a driving power of the gearmotor 220 from the first slide head 207 to the second slide head 208 while permitting relative reciprocating movement of the first and second slide heads 207, 208.

Figure 10:
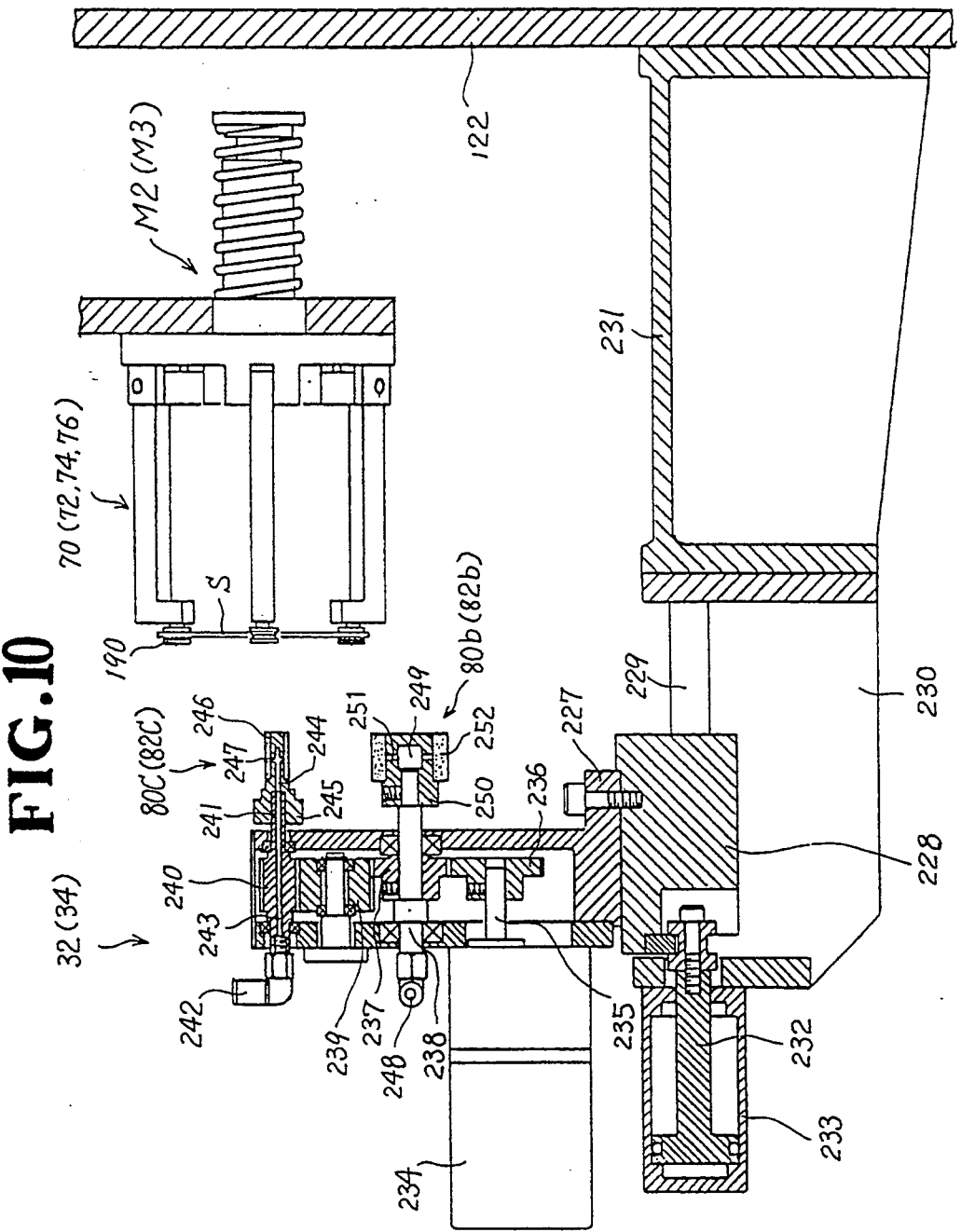
FIG. 10 is a cross-sectional view of the other part of the cleaning unit.

As shown in FIG. 10, the cleaning unit 32 further includes a third slide head 227 on which the cleaning members 80b, 80c are rotatably mounted. The third slide head 227 is disposed in juxtaposition to the first slide head 207 (FIG. 9) and is fixedly mounted on the upper surface of a support block 228. The support block 228 is slidably mounted on a pair of horizontal guide bars 229 (only one shown) supported on a support member 230 which is attached via an attachment block 231 to the frame 122. The support block 228 is connected to a piston rod 232 of an eleventh air cylinder 233 which is horizontally mounted on the support member 230. The piston rod 232 is normally disposed in a contracted position shown in FIG. 10. The eleventh air cylinder 233 is operated to reciprocate the third slide head 227 between a standby position in which the cleaning members 80b, 80c are spaced from the front surface of the substrate S supported on the substrate carrier 70-76 at the first cleaning position M2, as shown in FIG. 10, and a working position in which the cleaning members 80b, 80c are held in friction contact with the inner and outer peripheral edges S1, S2, respectively, of the substrate S supported on the substrate carrier 77-76 at the first cleaning position M2.

A gearmotor 234 is attached to the third slide head 227 and has a drive shaft 235 projecting into an internal space of the third slide head 227. The drive shaft 235 has a drive gear 236 mounted thereon and meshing with a first driven gear 237 secured to a first hollow shaft 238 on which the cleaning member 80b is mounted. The first driven gear 237 meshes with an intermediate gear 239 which in turn meshes with a second driven gear 240. The second driven gear 240 is formed on an outer peripheral surface of a second hollow shaft 241 on which the cleaning member 80c is mounted. With this construction, the cleaning members 80b, 80c rotate simultaneously in the same direction upon energization of the gearmotor 234.

The second hollow shaft 241 is rotatably supported on the third slide head 227 and fixedly connected at one end to one end of a pipe 242. The opposite end of the second hollow shaft 241 supports thereon the cleaning member 80c. The second hollow shaft 241 has an axial hole 243 communicating, at its one end, with the pipe 242 and, at the other end, with an open end of an axial blind hole 244 formed in a body or shank 245 of the cleaning member 80c. The cleaning member 80c includes an annular cleaning pad 246 made, for example, of sponge rubber and firmly fitted over the shank 245. The shank 245 has a radial hole 247 extending transversely across the axial blind hole 244 and opening to an inner peripheral surface of the cleaning pad 246. A neutral liquid detergent is supplied from the pipe 242 through the holes 243, 244, 247 to the cleaning pad 246.

The first hollow shaft 238 is rotatably supported on the third slide head 227 and fixedly connected at one end to a pipe 248. The opposite end of the first hollow shaft 238 is firmly fitted in an axial blind hole 249 formed in a body or shank 250 of the cleaning member 80b. The shank 250 has a radial hole 251 extending transversely across the axial blind hole 249 and opening to an inner peripheral surface of an annular cleaning pad 252 which is firmly fitted over the shank 250. The neutral liquid detergent is also supplied from the pipe 248 to the cleaning pad 252 successively through an axial hole (not shown) in the first hollow shaft 238 and through the axial and radial holes 249, 251 in the shank 150.

The cleaning unit 32 of the foregoing construction is normally disposed in the standby position shown in FIGS. 9 and 10. Operation of the cleaning unit 32 starts when the substrate S supported on each of the substrate carriers 70–76 arrives at the first cleaning position M2 upon intermittent rotation of the index table 30. Upon arrival of the substrate S at the cleaning position M2, the ninth air cylinder 205 shown in FIG. 9 is driven to extend its piston rod 204 to move the support block 203 upwards until the cleaning pads 80a, 80a are disposed in confrontation with the opposite sides of the substrate S. Then, the gearmotor 220 is driven to rotate the pad-like cleaning members 80a, 80a simultaneously, and the tenth air cylinder 216 is driven to contract its piston rod 218. The contracting movement of the piston rod 218 causes the second slide head 208 to slide leftwards in FIG. 9 along the guide bars 206. The leftward movement of the second slide head 208 is stopped when the second slide head 208 abuts against the stop arm 212 of the stopper 209. In this instance, the pad-like cleaning member 80a supported on the second slide head 208 is brought into friction contact with one of opposite surfaces of the substrate S. A further contracting action of the piston rod 218 causes the body of the tenth air cylinder 216 to move rightwards in the same figure until the first slide head 207 abuts on the stop arm 211. When the rightward movement of the first slide head 207 is stopped by the stopper 209, the pad-like cleaning member 80a supported on the first slide head 207 is brought into friction contact with the other of the opposite surfaces of the substrate S. Since the substrate S is rotatably supported on the substrate carrier 70–76 by means of the clamp rollers 190, the substrate S rotates about its own axis at the same time as the pad-like cleaning members 80a revolve about their own axes.

Simultaneously with the energization of the gearmotor 220, the gearmotor 214 shown in FIG. 10 is driven to rotate the cleaning member 80b and the cleaning member 80c, and a neutral liquid detergent is supplied into the pipes 242, 248. Thereafter, the eleventh air cylinder 233 is driven to extend its piston rod 232 to thereby advance the third slide head 227 toward the working position. When the piston rod 232 is fully extended, the cleaning pads 246 and 252 of the respective cleaning members 80c and 80b are held in friction contact with the inner and outer peripheral edges S1 and S2, respectively, of the substrate S.

Figure 11:
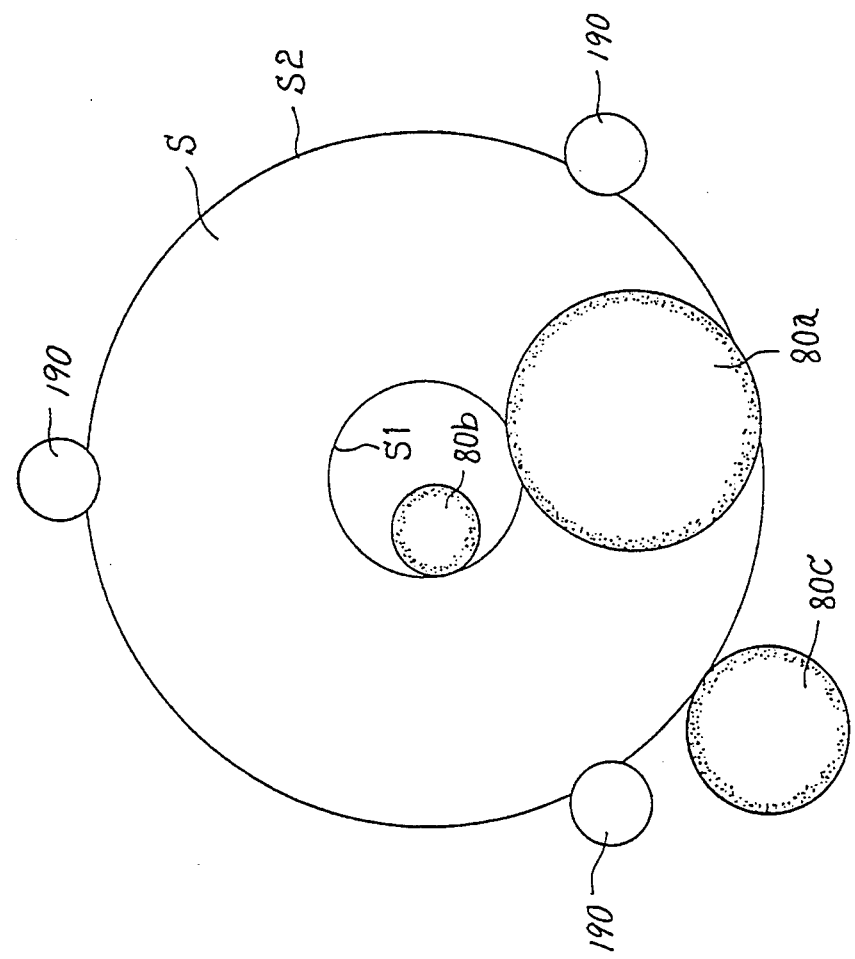
FIG. 11 is an enlarged plan view of the substrate as it is subjected to a scrub cleaning operation performed in the cleaning station.

Thus, the opposite surfaces of the substrate S supported on the substrate carrier 70–76 at the first cleaning position M2 are cleaned by the pad-like cleaning members 80a, 80a, and the inner and outer peripheral edges S1, S2 of the same substrate S are respectively cleaned by the cleaning members 80b, 80c, as shown in FIG. 11. During the cleaning operation, the neutral liquid detergent is continuously supplied to the pad-like cleaning members 246, 252. Thus, a scrub cleaning operation using the neutral liquid detergent is performed on the substrate S.

When the scrub cleaning operation is completed, the eleventh air cylinder 233 (FIG. 10) is driven again to contract its piston rod 232 to move the third slide head 227 from the working position to the original standby position shown in FIG. 10. Substantially at the same time, the tenth air cylinder 216 (FIG. 9) is driven again to extend its piston rod 218 whereby the first and second slide heads 207, 208 move away from each other and return to the original standby position shown in FIG. 9. Thereafter, the ninth air cylinder 205 is driven again to contract its piston rod 204 to lower the support block 203 and the first and second slide heads 207, 208 to the standby position shown in FIG. 9. Then, the gearmotors 220, 234 are de-energized to stop the cleaning members 80a, 80b, 80c, and the supply of the neutral liquid detergent to the pipes 242, 248 is terminated. As an alternative, the cleaning members 80a, 80b, 80c may be continuously rotated throughout the operation of the apparatus. Similarly, the neutral liquid detergent may be continuously supplied as long as the operation of the apparatus continues.

The second cleaning unit 34 shown in FIG. 1 has the same construction, and operates in the same manner, as the first cleaning unit 32 detailed just above with the exception that the cleaning unit 34 performs an additional cleaning operation using tap or purified water supplied to the cleaning members 82b, 82c. Due to the structural and operational similarity, a further description of the second cleaning unit 34 will be omitted.

Figure 12:
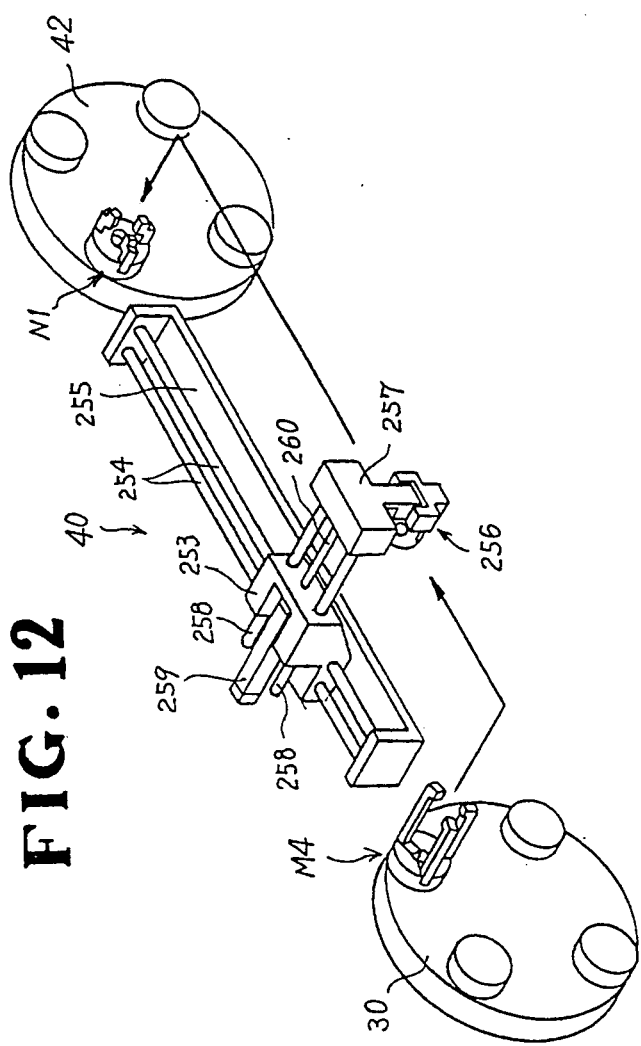
FIG. 12 is a schematic perspective view of a substrate transfer unit of the apparatus.

FIG. 12 schematically shows the general construction of the substrate transfer unit 40. The substrate transfer unit includes a saddle 253 slidably mounted on a pair of parallel spaced horizontal guide bars 254 supported on an elongated support member 255 secured to the frame 122 (FIG. 1) of the apparatus. A substrate gripper assembly 256 is mounted on a support block 257. The support block 257 is slidably mounted on the saddle 253 via a pair of parallel spaced horizontal guide bars 258 extending from the support block 257. A twelfth air cylinder 259 is horizontally mounted on the saddle 253 and has a piston rod 260 secured to the support block 257. Thus, in response to the operation of the twelfth air cylinder 259, the substrate gripper assembly 256 is movable in a direction perpendicular to a common plane of the vertical indexes 30 and 42. The piston rod 260 is normally disposed in the extended position.

The saddle 253 includes a built-in drive means, such as a drive motor (not shown), and is movable along the guide bars 254 between a first position (standby position) in which the gripper assembly 256 is disposed intermediately between the substrate removing position M4 of the cleaning station 12 (FIG. 1) and the substrate mounting position N1 of the drying station 12 (FIG. 1), a second position (receiving position) in which the gripper assembly 256 is disposed in confrontation to the substrate carrier 70-76 which is located at the substrate removing position M4, and a third position (supplying position) in which the gripper assembly 256 is disposed in confrontation to the substrate carrier 100-106 which is located at the substrate mounting position N1. The gripper assembly 256 is normally disposed in the first, standby position, as shown in FIG. 1.

Figure 13:
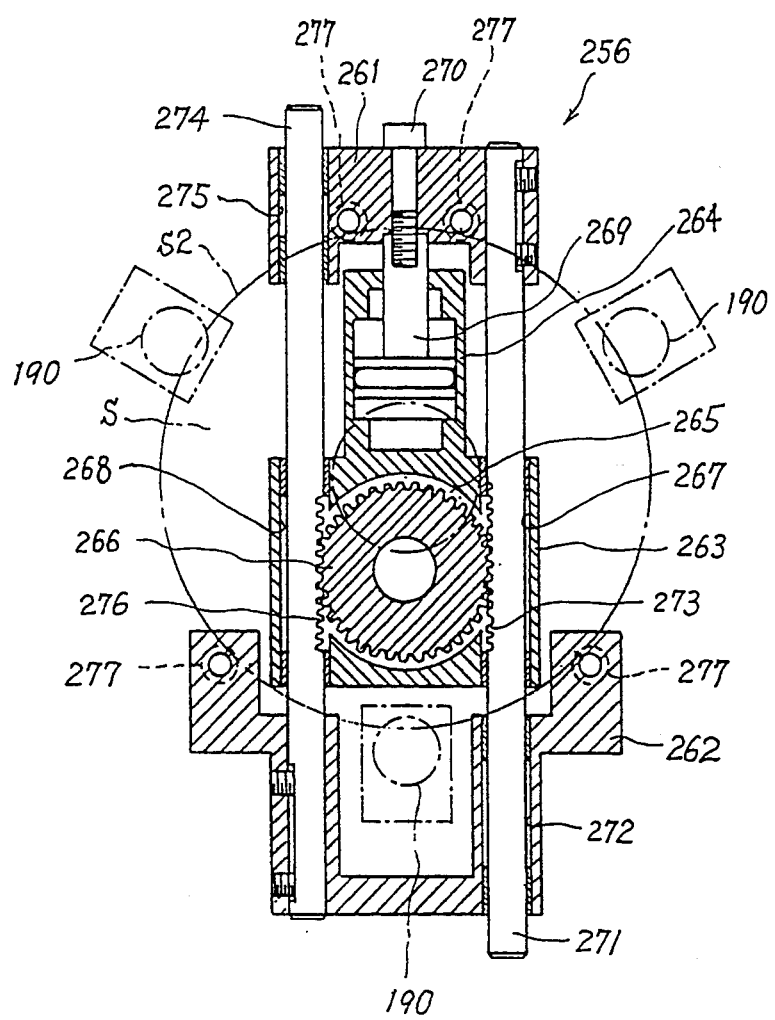
FIG. 13 is a vertical cross-sectional view of a substrate gripper of the substrate transfer unit.

The gripper assembly includes, as shown in FIG. 13, a pair of vertically spaced grip fingers 261 and 262 movably mounted on a gripper body 263, and a thirteenth air cylinder 264 vertically disposed on the gripper boy 163 for actuating the grip fingers 261, 262 to releasably hold the substrate S. The gripper body 263 is secured to the support block 257 (FIG. 12) and has a central circular chamber 265 in which a pinion 266 is rotatably mounted. The gripper body 263 further has a pair of vertical guide holes 267 and 268 connected with diametrically opposite portions of the circular chamber 265. The thirteenth air cylinder 264 has a piston rod 269 connected by a screw 270 to the first (upper) grip finger 261.

A first connecting rod 271 is slidably received in the guide hole 267 and has one end (upper end) secured by a pair of screws (not designated) to the first (upper) grip finger 261. The opposite end portion (lower end portion) of the first connecting rod 271 is slidably guided in a vertical guide hole 272 formed in the second (lower) grip finger 262. The first connecting rod 271 includes a rack 273 meshing with the pinion 266.

Similarly, a second connecting rod 274 is slidably received in the vertical guide hole 268 and has one end (lower end) secured by a pair of screws (not designated) to the second (lower) grip finger 262. The opposite end portion (upper end portion) of the second connecting rod 274 is slidably guided in a vertical guide hole 275 formed in the first grip finger 261. The second connecting rod 274 includes a rack 276 meshing with the pinion 266.

Each of the first and second (upper and lower) grip fingers 261, 262 has a pair of laterally spaced clamp rollers 277 rotatably mounted thereon for gripping the outer peripheral edge S2 of the substrate when the thirteenth air cylinder 264 is activated to urge the grip fingers 261, 262 toward each other. The clamp rollers 277 are disposed in such an arrangement that they do not interfere with the clamp rollers 190 on each of the substrate carriers 70-76 when the gripper assembly 256 is actuated to take up the substrate S from the substrate carrier 70-76 located at the substrate removing position M4 (FIG. 12). The clamp rollers 277 are circumferentially grooved so that the outer peripheral edge S2 of the substrate S is received in the circumferential grooves of the respective clamp rollers 277.

With the gripper assembly 256 thus constructed, the thirteenth air cylinder 264 is driven to reciprocate its piston rod 269. In response to the reciprocating movement of the piston rod 269, the first and second grip fingers 261, 262 move toward and away from each other to releasably grip the outer peripheral edge S2 of the substrate S by means of the clamp rollers 277. The piston rod 269 is normally disposed in a fully extended position in which the clamp rollers 277 on the first grip finger 261 and the clamp rollers 277 on the second grip finger 262 are vertically spaced by a distance which is greater than the outside diameter of the substrate S. When the thirteenth air cylinder 264 is activated to contract its piston rod 269, the first grip finger 261 is pulled downwards in FIG. 13. The downward movement of the first grip finger 261 is translated into an upward movement of the second grip finger 262 by means of a rack-and-pinion mechanism which is composed of the rack 273 on the first connecting rod 271, the pinion 266, and the rack 276 on the second connecting rod 274. Thus, the first and second grip fingers 261, 262 concurrently move toward each other to grip the outer peripheral edge S2 of the substrate S by the clamp rollers 277.

The substrate transfer unit 40 of the foregoing construction is operated in timed relation to the operation of the index tables 30 and 42 (FIG. 11) such that while the index tables 30, 42 are at rest, the substrate S is taken up from the substrate carrier 70-76 which is located in the substrate removing position M4, and subsequently transferred to the substrate carrier 100-106 which is located in the substrate mounting position N1.

When the index table 30 is turned to shift one of the substrate carriers 70-76 from the second cleaning position M3 to the substrate removing position M4, the saddle 253 of the transfer unit 40 is driven to move the gripper assembly 256 in the leftward direction in FIG. 11. Thus, the gripper assembly 256 is brought from the standby position (see FIG. 1) to the receiving position where the gripper assembly 256 is disposed in front of the substrate S supported on the substrate carrier 70-76 located in the substrate removing position. After the substrate S is rinsed with a shower of pure water at the substrate removing position, the twelfth air cylinder 259 (FIG. 12) is activated to contract its piston rod 260. When the piston rod 260 is fully contracted, the substrate S is received between the clamp rollers 277 (FIG. 13) of the first and second grip fingers 261, 262. Then the thirteenth air cylinder 264 is driven to contract its piston rod 269. Thus, the first and second grip fingers 261, 262 move toward each other and eventually grip the outer peripheral edge S2 of the substrate S by means of the clamp rollers 277. Subsequently, the substrate carrier 70-76 located in the substrate removing position M4 is operated to release the substrate S in the manner described above, and after that the twelfth air cylinder 259 (FIG. 12) is activated again to extend its piston rod 260. Thus, the gripper assembly 256 while holding the substrate S is retracted away from the substrate carrier 70-76 which is located in the substrate removing position M4.

Thereafter, the saddle 253 slides rightwards in FIG. 12 so as to move the gripper assembly 256 to the supplying position in which the gripper assembly 256 is disposed in front of the substrate carrier 100-106 which is located in the substrate mounting position N1 of the substrate drying station 12 (FIG. 1). When the gripper assembly 256 arrives at the supplying position, the twelfth air cylinder 256 is driven to contract its piston rod 260 to thereby advance the gripper assembly 256 toward the substrate carrier 100-106 which is located in the substrate mounting position N1. Then, the substrate carrier 100-106 located at the substrate mounting position N1 is actuated to support the substrate S, and subsequently the thirteenth air cylinder 264 is driven to extend its piston rod 269, thereby moving the first and second grip fingers 261, 262 away from each other. As a result, the substrate S is released from the gripper assembly 256. Thus, the substrate S which is taken up from the substrate carrier 70-76 at the substrate removing position M4 of the cleaning station 10 (FIG. 1) is transferred to the substrate carrier 100-106 located in the substrate mounting position N1 of the drying station 12 (FIG. 1). The twelfth air cylinder 259 is driven again to extend its piston rod 260, thereby retracting the gripper assembly 256 away from the substrate carrier 100-106 which is located in the substrate mounting position N1. Following this, the saddle 253 is driven leftwards in FIG. 11 until the gripper assembly 256 returns to its original standby position shown in FIG. 1.

Figure 14:
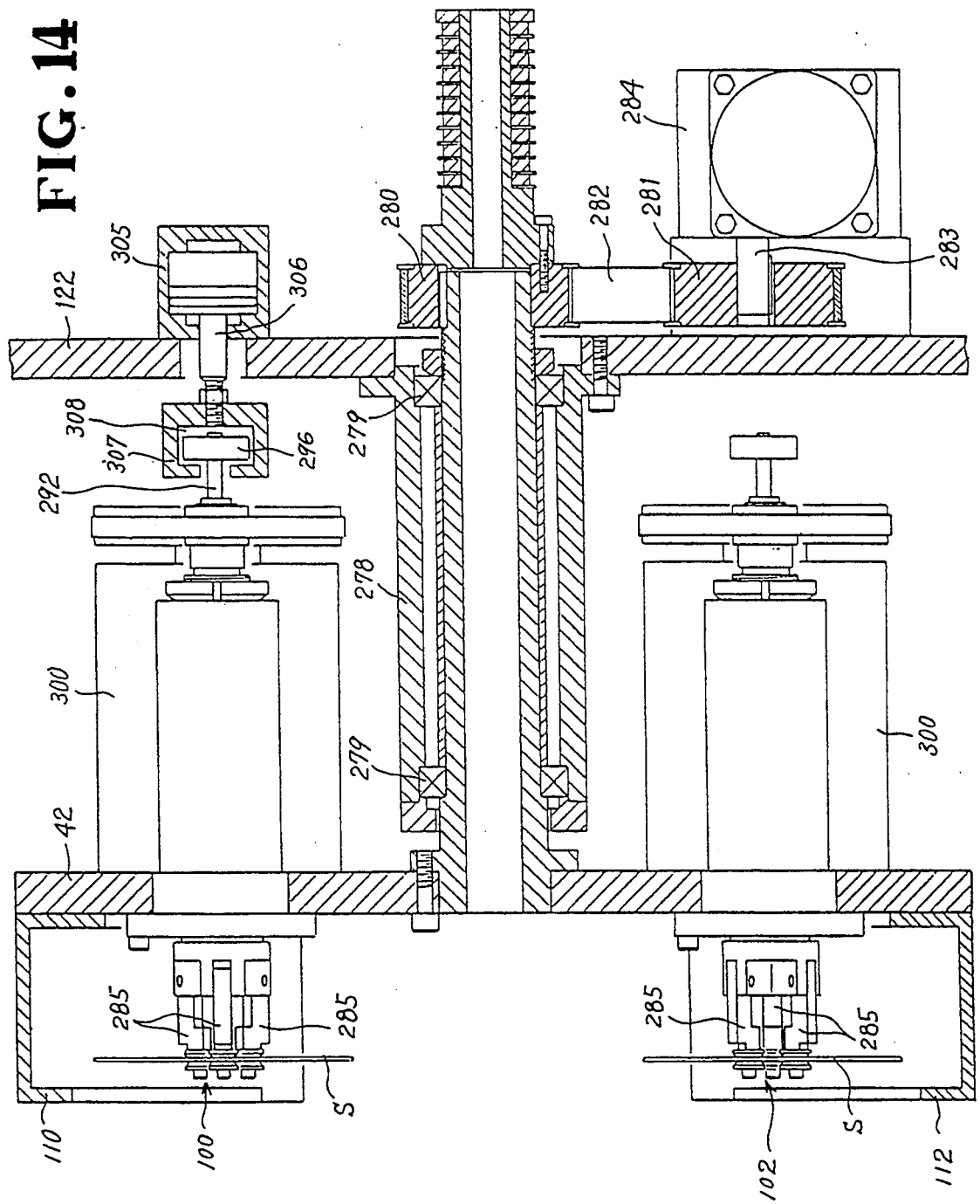
FIG. 14 is a cross-sectional view of an index table and a plurality of substrate carriers which are incorporated in a substrate drying station of the apparatus.

FIG. 14 is a vertical cross-sectional view of the index table 42 on which four substrate carriers 100-106 are mounted. The shaft 43 of the index table 42 is a hollow shaft which is rotatably mounted on a tubular support portion 278 of the frame 122 via a pair of ball bearings 279. One end of the hollow shaft 43 is screwed to a body of the index table 42, while the opposite end of the shaft 43 is keyed to a driven pulley 280. The driven pulley 280 is connected in driven relation to a drive pulley 281 by means of an endless belt 282. The drive pulley 281 is keyed to a drive shaft 283 of a motor-driven index head 284 secured to the frame 122. As previously mentioned, the substrate carriers 100-106 are circumferentially spaced at equal angular intervals and each include three substrate holding levers 285. Since the substrate carriers 100-106 have the same construction, only one substrate carrier 100 will be described below in greater detail with reference to FIG. 15.

Figure 15:
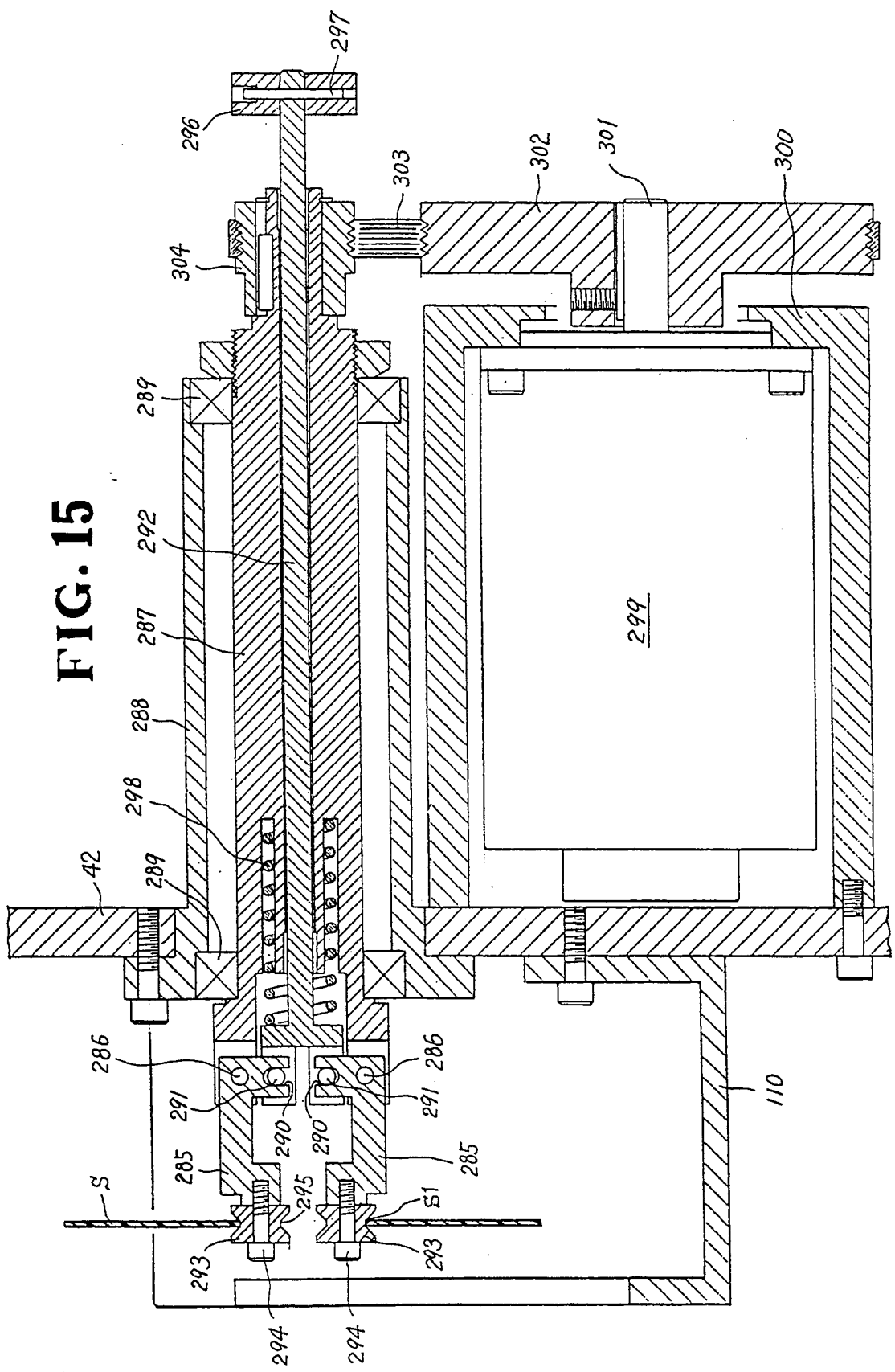
FIG. 15 is an enlarged cross-sectional view of one of the substrate carrier.

As shown in FIG. 15, each of the substrate holding levers 285 (two being shown) has a generally L shape. The generally L-shaped substrate holding lever 285 has an intermediate portion pivotally connected by a pin 286 to one end of a hollow shaft 287. The hollow shaft 287 is rotatably mounted on a tubular support member 288 via a pair of ball bearings 289. The support member 288 is secured at one end to the index table 42 and extends from the index table 42 toward the frame (FIG. 14) in parallel spaced relation to the shaft 43 (FIG. 14). One end of the L-shaped substrate holding lever 285 has a slot or groove 290 slidably receiving therein a pin 291 which is provided on one end of a slide member 292. The L-shaped substrate holding lever 285 is provided with a clamp roller 293 non-rotatably attached by a screw 294 to the other end of the L-shaped substrate holding lever 285. The clamp roller 293 is circumferentially grooved as at 295 so that a portion of the inner peripheral edge S1 of the substrate S is receivable in the circumferential groove 295. The slide member 292 is slidably received in the hollow shaft 287. A disk-like actuating plate 296 is attached by a pin 297 to the other end of the slide member 292 which is located remotely from the substrate holding levers 285. A compression coil spring 298 acts between the hollow shaft 287 and the slide member 292 to urge the latter leftwards in FIG. 15 so as to turn the substrate holding levers 285 about the pins 286 such that the clamp rollers 293 move in a radially outward direction of the hollow shaft 287. When the slide member 292 moves rightwards in FIG. 15 against the force of the compression coil spring 298, the substrate holding levers 285 turn about the pins 286 so as to move the clamp rollers 293 in a radially outward direction of the hollow shaft 287. The length and force of the compression coil spring 298 are determined such that when the compression coil spring 298 is in its free state, the clamp rollers 293 are able to clamp the inner peripheral edge S1 of the substrate S without causing any deformation on the substrate S.

The substrate carrier 100 is also provided with a spin motor 299 mounted within a motor housing 300 secured by screws (not designated) to the underside of the index table 42. The spin motor 299 has a drive shaft 301 keyed to a drive pulley 302. The drive pulley 302 is connected by a V-ribbed endless belt 303 to a driven pulley 304 which is keyed to an end of the hollow shaft 287 remote from the substrate holding levers 285. The spin motor 299 is driven to rotate the associated substrate carrier 100 for enabling a spin drying operation of the substrate S carried on the substrate carrier 100.

Referring back to FIG. 14, there is shown a fourteenth air cylinder 305 which is attached to the frame 122 at a position corresponding in position to the substrate mounting position N1 of the substrate drying station 12 (FIG. 1). The fourteenth air cylinder 305 has a piston rod 306 and an actuating arm 307 firmly connected to an end of the piston rod 306. The piston rod 306 is normally disposed in the extended position shown in FIG. 14. The actuating arm 307 has an inverted T-shaped groove 308 for loosely receiving therein the disk-like actuating member 296 of each of the substrate carriers 100-106. The T-shaped groove 308 extends arcuately through the actuating arm 307 in concentrical relation to the hollow shaft 43 so that the actuating member 292 is able to pass the T-shaped groove 303 during operation of the index table 42. Though not shown, fifteenth air cylinder which is identical in construction to the fourteenth air cylinder 305 is mounted on the frame 122 at a position corresponding to the substrate removing position N4 of the substrate drying station 12 (FIG. 1).

The index table 42 of the foregoing construction operates as follows. The operation begins in a condition in which none of the substrate carriers 100-106 is supporting the substrate S. While the index table 42 is at rest, the actuating member 296 of the substrate carrier 100 which is located in the substrate mounting position N1 is received in the T-shaped groove 308 of the actuating arm 307 attached to piston rod 306 of the fourteenth air cylinder 305. In this condition, the fourteenth air cylinder 305 is driven to contract its piston rod 306 to pull the slide member 292 rightwards in FIG. 13 against the force of the spring 298 (FIG. 15). The rightward movement of the slide member 292 causes the substrate holding levers 285 to turn about the pins 286 in a radially inward direction of a substrate S to be supported on the substrate carrier 100. With this angular movement of the substrate holding levers 285, the clamp rollers 293 move toward each other to such an extent that the inner peripheral edge S1 of the substrate S is able to pass over the clamp rollers 293.

Then, the previously described substrate transfer unit 40 is driven to transfer the substrate S from the substrate cleaning station 10 (FIG. 1) to the substrate drying station 12 (FIG. 1). By the transfer unit 40, the substrate S is loosely fitted over the clamp rollers 293 of the substrate carrier 100. The fourteenth air cylinder 305 is activated again to extend its piston rod 306. As the piston rod 306 extends, the slide member 295 moves leftwards in FIG. 15 under the force of the spring 298. With this leftward movement of the slide member 295, the substrate holding levers 285 pivot about the pins 286 in a radially outward direction of the substrate S, thereby enabling the clamp rollers 293 to clamp the inner peripheral edge S1 of the substrate S. Thereafter, the transfer unit 40 is returned to its original position which is located centrally between the substrate cleaning station 10 and the substrate drying station 12. Now, the substrate S is supported on the substrate carrier 100, as shown in FIG. 15.

Subsequently, the motor-driven index head 284 shown in FIG. 14 is driven to turn the index table 42 in the direction of the arrow 41 (FIG. 2) through an angle of 90 degrees. With this angular movement of the index table 42, the substrate carrier 100 is brought into the first substrate drying position N2 (FIG. 2), and the substrate carrier 106 is brought into the substrate mounting position N1.

Then, the substrate carrier 100 is driven by the spin motor 299 (FIG. 15) to revolve or spin the substrate S at a high speed, thereby removing superfluous water on the substrate S. Thus, the spin dry operation is performed on the substrate S carried on the substrate carrier 100. During this operation, the fourteenth air cylinder 305 is driven again to enable the substrate carrier 106 to support the next substrate S in the same manner as described above.

Thereafter, the index table 42 further turns in the direction of the arrow 41 (FIG. 2) through an angle of 90 degrees whereby the substrate S carried on the substrate carrier 100 is brought into the second drying position N3. At the second drying position N3, the substrate S is further subjected to an additional spin dry operation. During this additional spin dry operation, the substrate S carried on the substrate carrier 106 is subjected to a first spin dry operation performed at the first drying position N2, and the next substrate S is transferred to the substrate carrier 104 disposed in the substrate mounting position N1.

The index table 42 is then turned in the direction of the arrow 41 (FIG. 2) through an angle of 90 degrees. With this angular movement of index table 42, the substrate S carried on the substrate carrier 100 is brought into the substrate removing position N4. In this substrate removing position N4, the substrate S is gripped by the gripper assembly 151 (FIG. 5) of the substrate unloading unit 50. Then, the non-illustrated fifteenth air cylinder (identical to the fourteenth air cylinder 305 shown in FIG. 14) is driven to actuate the substrate carrier 100 such that the clamp rollers 293 on the respective substrate holding levers 285 move toward each other to release the inner peripheral edge S1 of the substrate S. The substrate S is subsequently removed from the substrate drying station 12 (FIG. 1) and then transferred to the magazine 60 by means of the unloading unit 50 in the manner described above. During this unloading operation, the next substrate S is supplied to the substrate carrier 102 located at the substrate mounting position N1, the substrate S carried on the substrate carrier 104 is subjected to a first spin dry operation at the first drying position N2, and the substrate S carried on the substrate carrier 106 is subjected to a second spin dry operation at the second drying position N3.

Thus, a series of cleaned substrates S which are successively supplied to the substrate cleaning station 10 (FIG. 1) are dried at the substrate drying station 12 (FIG. 1) and subsequently delivered into a subsequent processing station.

In the embodiment described above with reference to FIGS. 1 through 15, each of the cleaning operation and drying operation is performed in two stages. However, the present invention is not limited to such a two-stage cleaning and drying operations. Instead, a single stage cleaning operation and a single stage drying operation may be used. In this instance, each of the index tables 30, 42 may support thereon three substrate carriers circumferentially spaced at equal angular intervals about its axis of rotation. As a further alternative, five or more substrate carriers may be disposed on each of the index tables 30, 42.

As appears clear from the foregoing description, according to the invention, batches of hard disk substrates are cleaned and then dried successively, so that the apparatus of this invention is able to considerably cut down a processing time which is required in the case of the conventional cleaning and drying apparatus.

Obviously, various minor changes and modifications of the present invention are possible in the light of the above teaching. It is therefore to be understood that within the scope of the appended claims the invention may be practiced otherwise than as specifically described.

What is claimed is:

1. An apparatus for cleaning and then drying hard disk substrates, comprising:

a first index table intermittently rotatable about a first axis;

a second index table intermittently rotatable about a second axis;

at least three first substrate carriers, disposed on said first index table and circumferentially spaced at equal angular intervals, for carrying a plurality of hard disk substrates; and at least three second substrate carriers, disposed on said second index table and circumferentially spaced at equal angular intervals, for carrying a plurality of hard disk substrates, means for transferring said hard disk substrates between said index tables, means for mounting said hard disk substrates on said first and second substrate carriers, means for cleaning said hard disk substrates, means for removing said hard disk substrates from said first and second substrate carriers, means for drying said hard disk substrates, wherein upon rotation of said first index table, said first substrate carriers move successively through a first substrate mounting position in which a hard disk substrate is mounted on one of said first substrate carriers, a substrate cleaning position in which a hard disk substrate mounted on one of said first substrate carriers at said first substrate mounting position is cleaned by said cleaning means, and a first substrate removing position in which a hard disk substrate cleaned at said substrate cleaning position is removed from one of said first substrate carriers by said removing means, and wherein upon rotation of said second index table, said second substrate carriers move successively through a second substrate mounting position in which a hard disk substrate removed from said first substrate removing position is mounted on one of said second substrate carriers, a substrate drying position in which a hard disk substrate mounted on one of said second substrate carriers, at said second substrate mounting position is dried by said drying means, and a second substrate removing position in which a hard disk substrate dried at said substrate drying station is removed form one of said second substrate carriers by said removing means.

2. An apparatus according to claim 1, wherein said means for cleaning includes a cleaning unit reciprocally movable toward and away from said substrate cleaning position for cleaning the hard disk substrate held on said first substrate carrier which is located at said cleaning position.

3. An apparatus according to claim 2, wherein said means for mounting said hard disk substrates on each of said first substrate carriers includes a plurality of substrate holders circumferentially spaced at equal angular intervals and cooperating with each other to rotatably support an outer peripheral edge of the hard disk substrate, said cleaning unit including a pair of rotating pad-like first cleaning members frictionally engageable with opposite surfaces of the hard disk substrate while the hard disk substrate is rotating together with said pad-like first cleaning members, a second cleaning member frictionally engageable with an outer peripheral edge of the hard disk substrate, and a third cleaning member frictionally engageable with an inner peripheral edge of the hard disk substrate.

4. An apparatus according to claim 1, wherein the number of said first substrate carriers is four, said substrate cleaning position comprises a first substrate cleaning position and a second substrate cleaning position disposed between said first substrate mounting position and said first substrate removing position, and said four first substrate carriers, upon rotation of said first index table, moves successively through said first substrate mounting position, said first substrate cleaning position, said second substrate cleaning position and said first substrate removing position.

5. An apparatus according to claim 4, wherein said means for cleaning includes a first cleaning unit reciprocally movable toward and away from said first substrate cleaning position for cleaning the hard disk substrate held on said first substrate carrier which is located at said first substrate cleaning position, and a second cleaning unit reciprocally movable toward and away from said second substrate cleaning position for cleaning the hard disk substrate held on said first substrate carrier which is located at said first substrate cleaning position.

6. An apparatus according to claim 5, wherein said means for mounting said hard disk substrates on each of said first substrate carriers includes a plurality of substrate holders circumferentially spaced at equal angular intervals and cooperating with each other to rotatably support an outer peripheral edge of the hard disk substrate, each of said first and second cleaning units including a pair of rotating pad-like first cleaning members frictionally engageable with opposite surfaces of the hard disk substrate while the hard disk substrate is rotating together with said pad-like first cleaning members, a second cleaning member frictionally engageable with an outer peripheral edge of the hard disk substrate, and a third cleaning member frictionally engageable with an inner peripheral edge of the hard disk substrate.

7. An apparatus according to claim 1, wherein said means for mounting said hard disk substrates on each of said second substrate carriers holds an inner peripheral edge of the hard disk substrate and said means for drying includes means for rotating the hard disk substrate at a high speed to spin dry the hard disk substrate.

8. An apparatus according to claim 1, wherein the number of said second substrate carriers is four, said substrate drying position comprises a first substrate drying position and a second substrate drying position disposed between said second substrate mounting position and said second substrate removing position, and said four second substrate carriers, upon rotation of said second index table, moves successively through said second substrate mounting position, said first substrate drying position, said second substrate drying position and said second substrate removing position.

9. An apparatus according to claim 8, wherein said means for mounting said hard disk substrates on each of said second substrate carriers holds an inner peripheral edge of the hard disk substrate and said means for drying includes means for rotating the hard disk substrate at a high speed to spin dry the hard disk substrate, wherein said second substrate carriers continuously rotate while they are disposed in said first and second drying positions and also while they are removed from said first drying position and said second drying position.

10. An apparatus according to claim 1, further including loading means for supplying a plurality of hard disk substrates one at a time to said first substrate carrier which is disposed in said first mounting position, said means for removing said hard disk substrates being operable to remove a cleaned hard disk substrate from said first substrate carrier disposed in said first substrate removing position and said transferring means being operable to transfer the cleaned hard disk substrate to said second substrate carrier which is disposed in said second substrate mounting position, and said means for removing said hard disk substrates further includes unloading means for removing a dried hard disk substrate from said second substrate carrier disposed in said second substrate removing position.

* * * * *

UNITED STATES PATENT AND TRADEMARK OFFICE
CERTIFICATE OF CORRECTION

PATENT NO. : 5,357,645
DATED : October 25, 1994
INVENTOR(S) : Masami ONODERA

It is certified that error appears in the above-indentified patent and that said Letters Patent is hereby corrected as shown below:

On the title page, please delete item [30] in its entirety.

Signed and Sealed this

Twenty-fifth Day of April, 1995

Attest:

BRUCE LEHMAN

*Attesting Officer*   *Commissioner of Patents and Trademarks*